United States Patent
Mullis

(10) Patent No.: US 9,741,118 B2
(45) Date of Patent: *Aug. 22, 2017

(54) SYSTEM AND METHODS FOR CALIBRATION OF AN ARRAY CAMERA

(71) Applicant: FotoNation Cayman Limited, San Jose, CA (US)

(72) Inventor: Robert Mullis, Santa Cruz, CA (US)

(73) Assignee: FotoNation Cayman Limited, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,694

(22) Filed: Aug. 31, 2015

(65) Prior Publication Data

US 2016/0163051 A1    Jun. 9, 2016

Related U.S. Application Data

(63) Continuation of application No. 14/203,308, filed on Mar. 10, 2014, now Pat. No. 9,124,831.
(Continued)

(51) Int. Cl.
*G06T 7/00* (2017.01)
*H04N 5/247* (2006.01)
(Continued)

(52) U.S. Cl.
CPC ............ *G06T 7/0018* (2013.01); *G06T 7/80* (2017.01); *H04N 5/247* (2013.01); *H04N 5/3572* (2013.01); *H04N 5/367* (2013.01)

(58) Field of Classification Search
CPC ...... H04N 5/367; H04N 5/3572; H04N 5/217; H04N 5/247; H04N 3/20; H04N 3/24;
(Continued)

(56) References Cited

U.S. PATENT DOCUMENTS 4,124,798 A    11/1978   Thompson
4,198,646 A    4/1980    Alexander et al.
(Continued)

FOREIGN PATENT DOCUMENTS

CN    1839394 A    9/2006
EP    840502 A2    5/1998
(Continued)

OTHER PUBLICATIONS

US 8,957,977, 02/2015, Venkataraman et al. (withdrawn)
(Continued)

*Primary Examiner* — Brian Yenke
*Assistant Examiner* — Sean Haiem
(74) *Attorney, Agent, or Firm* — KPPB LLP

(57) ABSTRACT

Systems and methods for calibrating an array camera are disclosed. Systems and methods for calibrating an array camera in accordance with embodiments of this invention include the detecting of defects in the imaging components of the array camera and determining whether the detected defects may be tolerated by image processing algorithms. The calibration process also determines translation information between imaging components in the array camera for use in merging the image data from the various imaging components during image processing. Furthermore, the calibration process may include a process to improve photometric uniformity in the imaging components.

9 Claims, 7 Drawing Sheets

Related U.S. Application Data

(60) Provisional application No. 61/780,748, filed on Mar. 13, 2013.

(51) Int. Cl.
   *H04N 5/367* (2011.01)
   *H04N 5/357* (2011.01)
   *G06T 7/80* (2017.01)

(58) Field of Classification Search
   CPC ...... H04N 17/002; H04N 17/00; H04N 17/02; G06T 7/0018
   See application file for complete search history.

(56) References Cited

U.S. PATENT DOCUMENTS

| | | |
|---|---|---|
| 4,323,925 A | 4/1982 | Abell et al. |
| 4,460,449 A | 7/1984 | Montalbano |
| 4,467,365 A | 8/1984 | Murayama et al. |
| 5,005,083 A | 4/1991 | Grage |
| 5,070,414 A | 12/1991 | Tsutsumi |
| 5,144,448 A | 9/1992 | Hornbaker |
| 5,327,125 A | 7/1994 | Iwase et al. |
| 5,629,524 A | 5/1997 | Stettner et al. |
| 5,808,350 A | 9/1998 | Jack et al. |
| 5,832,312 A | 11/1998 | Rieger et al. |
| 5,880,691 A | 3/1999 | Fossum et al. |
| 5,933,190 A | 8/1999 | Dierickx et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,097,394 A | 8/2000 | Levoy et al. |
| 6,124,974 A | 9/2000 | Burger |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu et al. |
| 6,175,379 B1 | 1/2001 | Uomori et al. |
| 6,205,241 B1 | 3/2001 | Melen |
| 6,239,909 B1 | 5/2001 | Hayashi et al. |
| 6,358,862 B1 | 3/2002 | Ireland et al. |
| 6,443,579 B1 | 9/2002 | Myers et al. |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu |
| 6,627,896 B1 | 9/2003 | Hashimoto et al. |
| 6,628,330 B1 | 9/2003 | Lin |
| 6,635,941 B2 | 10/2003 | Suda |
| 6,639,596 B1 | 10/2003 | Shum et al. |
| 6,657,218 B2 | 12/2003 | Noda |
| 6,671,399 B1 | 12/2003 | Berestov |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,795,253 B2 | 9/2004 | Shinohara |
| 6,819,358 B1 | 11/2004 | Kagle et al. |
| 6,879,735 B1 | 4/2005 | Portniaguine et al. |
| 6,903,770 B1 | 6/2005 | Kobayashi et al. |
| 6,909,121 B2 | 6/2005 | Nishikawa |
| 6,927,922 B2 | 8/2005 | George et al. |
| 6,958,862 B1 | 10/2005 | Joseph et al. |
| 7,015,954 B1 | 3/2006 | Foote et al. |
| 7,085,409 B2 | 8/2006 | Sawhney et al. |
| 7,161,614 B1 | 1/2007 | Yamashita et al. |
| 7,199,348 B2 | 4/2007 | Olsen et al. |
| 7,235,785 B2 | 6/2007 | Hornback et al. |
| 7,262,799 B2 | 8/2007 | Suda |
| 7,292,735 B2 | 11/2007 | Blake et al. |
| 7,295,697 B1 | 11/2007 | Satoh |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen |
| 7,606,484 B1 | 10/2009 | Richards et al. |
| 7,633,511 B2 | 12/2009 | Shum et al. |
| 7,639,435 B2 | 12/2009 | Chiang et al. |
| 7,646,549 B2 | 1/2010 | Zalevsky et al. |
| 7,657,090 B2 | 2/2010 | Omatsu et al. |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,077,245 B2 | 12/2011 | Adamo et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev et al. |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev |
| 8,406,562 B2 | 3/2013 | Bassi et al. |
| 8,446,492 B2 | 5/2013 | Nakano et al. |
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |
| 8,559,756 B2 | 10/2013 | Georgiev et al. |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,655,052 B2 | 2/2014 | Spooner et al. |
| 8,682,107 B2 | 3/2014 | Yoon et al. |
| 8,692,893 B2 | 4/2014 | McMahon |
| 8,773,536 B1 | 7/2014 | Zhang |
| 8,780,113 B1 | 7/2014 | Ciurea et al. |
| 8,804,255 B2 | 8/2014 | Duparre |
| 8,830,375 B2 | 9/2014 | Ludwig |
| 8,831,367 B2 | 9/2014 | Venkataraman et al. |
| 8,842,201 B2 | 9/2014 | Tajiri |
| 8,854,462 B2 | 10/2014 | Herbin et al. |
| 8,861,089 B2 | 10/2014 | Duparre |

(56) References Cited

U.S. PATENT DOCUMENTS

| | | | |
|---|---|---|---|
| 8,866,912 B2* | 10/2014 | Mullis | H04N 17/002 348/187 |
| 8,866,920 B2 | 10/2014 | Venkataraman et al. | |
| 8,866,951 B2 | 10/2014 | Keelan | |
| 8,878,950 B2 | 11/2014 | Lelescu et al. | |
| 8,885,059 B1 | 11/2014 | Venkataraman et al. | |
| 8,896,594 B2 | 11/2014 | Xiong et al. | |
| 8,896,719 B1 | 11/2014 | Venkataraman et al. | |
| 8,902,321 B2 | 12/2014 | Venkataraman et al. | |
| 8,928,793 B2 | 1/2015 | McMahon | |
| 9,019,426 B2 | 4/2015 | Han et al. | |
| 9,025,894 B2 | 5/2015 | Venkataraman et al. | |
| 9,025,895 B2 | 5/2015 | Venkataraman et al. | |
| 9,031,335 B2 | 5/2015 | Venkataraman et al. | |
| 9,031,342 B2 | 5/2015 | Venkataraman et al. | |
| 9,031,343 B2 | 5/2015 | Venkataraman et al. | |
| 9,036,928 B2 | 5/2015 | Venkataraman et al. | |
| 9,036,931 B2 | 5/2015 | Venkataraman et al. | |
| 9,041,823 B2 | 5/2015 | Venkataraman et al. | |
| 9,041,824 B2 | 5/2015 | Lelescu et al. | |
| 9,041,829 B2 | 5/2015 | Venkataraman et al. | |
| 9,042,667 B2 | 5/2015 | Venkataraman et al. | |
| 9,124,831 B2 | 9/2015 | Mullis | |
| 9,124,864 B2* | 9/2015 | Mullis | H04N 17/002 |
| 2001/0005225 A1 | 6/2001 | Clark et al. | |
| 2001/0019621 A1 | 9/2001 | Hanna et al. | |
| 2001/0038387 A1 | 11/2001 | Tomooka et al. | |
| 2002/0012056 A1 | 1/2002 | Trevino | |
| 2002/0027608 A1 | 3/2002 | Johnson | |
| 2002/0039438 A1 | 4/2002 | Mori et al. | |
| 2002/0063807 A1 | 5/2002 | Margulis | |
| 2002/0087403 A1 | 7/2002 | Meyers et al. | |
| 2002/0089596 A1 | 7/2002 | Suda | |
| 2002/0094027 A1 | 7/2002 | Sato et al. | |
| 2002/0101528 A1 | 8/2002 | Lee | |
| 2002/0113867 A1 | 8/2002 | Takigawa et al. | |
| 2002/0113888 A1 | 8/2002 | Sonoda et al. | |
| 2002/0163054 A1 | 11/2002 | Suda et al. | |
| 2002/0167537 A1 | 11/2002 | Trajkovic | |
| 2002/0177054 A1 | 11/2002 | Saitoh et al. | |
| 2003/0025227 A1 | 2/2003 | Daniell | |
| 2003/0086079 A1 | 5/2003 | Barth et al. | |
| 2003/0124763 A1 | 7/2003 | Fan et al. | |
| 2003/0140347 A1 | 7/2003 | Varsa | |
| 2003/0179418 A1 | 9/2003 | Wengender et al. | |
| 2003/0190072 A1 | 10/2003 | Adkins et al. | |
| 2003/0211405 A1 | 11/2003 | Venkataraman | |
| 2004/0008271 A1 | 1/2004 | Hagimori et al. | |
| 2004/0012689 A1 | 1/2004 | Tinnerino | |
| 2004/0027358 A1 | 2/2004 | Nakao | |
| 2004/0047274 A1 | 3/2004 | Amanai | |
| 2004/0050104 A1 | 3/2004 | Ghosh et al. | |
| 2004/0056966 A1 | 3/2004 | Schechner et al. | |
| 2004/0061787 A1 | 4/2004 | Liu et al. | |
| 2004/0066454 A1 | 4/2004 | Otani et al. | |
| 2004/0096119 A1 | 5/2004 | Williams | |
| 2004/0100570 A1 | 5/2004 | Shizukuishi | |
| 2004/0105021 A1 | 6/2004 | Hu et al. | |
| 2004/0114807 A1 | 6/2004 | Lelescu et al. | |
| 2004/0151401 A1 | 8/2004 | Sawhney et al. | |
| 2004/0165090 A1 | 8/2004 | Ning | |
| 2004/0169617 A1 | 9/2004 | Yelton et al. | |
| 2004/0170340 A1 | 9/2004 | Tipping et al. | |
| 2004/0174439 A1 | 9/2004 | Upton | |
| 2004/0179834 A1 | 9/2004 | Szajewski | |
| 2004/0207836 A1 | 10/2004 | Chhibber et al. | |
| 2004/0213449 A1 | 10/2004 | Safaee-Rad et al. | |
| 2004/0218809 A1 | 11/2004 | Blake et al. | |
| 2004/0234873 A1 | 11/2004 | Venkataraman | |
| 2004/0240052 A1 | 12/2004 | Minefuji et al. | |
| 2004/0251509 A1 | 12/2004 | Choi | |
| 2004/0264806 A1 | 12/2004 | Herley | |
| 2005/0006477 A1 | 1/2005 | Patel | |
| 2005/0009313 A1 | 1/2005 | Suzuki et al. | |
| 2005/0012035 A1 | 1/2005 | Miller | |
| 2005/0036778 A1 | 2/2005 | DeMonte | |
| 2005/0047678 A1 | 3/2005 | Jones et al. | |
| 2005/0048690 A1 | 3/2005 | Yamamoto | |
| 2005/0068436 A1 | 3/2005 | Fraenkel et al. | |
| 2005/0083531 A1* | 4/2005 | Millerd | G01J 3/2803 356/450 |
| 2005/0128595 A1 | 6/2005 | Shimizu | |
| 2005/0132098 A1 | 6/2005 | Sonoda et al. | |
| 2005/0134698 A1 | 6/2005 | Schroeder | |
| 2005/0134712 A1 | 6/2005 | Gruhlke et al. | |
| 2005/0147277 A1 | 7/2005 | Higaki et al. | |
| 2005/0151759 A1 | 7/2005 | Gonzalez-Banos et al. | |
| 2005/0175257 A1 | 8/2005 | Kuroki | |
| 2005/0185711 A1 | 8/2005 | Pfister et al. | |
| 2005/0205785 A1 | 9/2005 | Hornback et al. | |
| 2005/0219363 A1 | 10/2005 | Kohler | |
| 2005/0225654 A1 | 10/2005 | Feldman et al. | |
| 2005/0275946 A1 | 12/2005 | Choo et al. | |
| 2005/0286612 A1 | 12/2005 | Takanashi | |
| 2005/0286756 A1 | 12/2005 | Hong et al. | |
| 2006/0002635 A1 | 1/2006 | Nestares et al. | |
| 2006/0023197 A1 | 2/2006 | Joel | |
| 2006/0023314 A1 | 2/2006 | Boettiger et al. | |
| 2006/0028476 A1 | 2/2006 | Sobel et al. | |
| 2006/0033005 A1 | 2/2006 | Jerdev et al. | |
| 2006/0034003 A1 | 2/2006 | Zalevsky | |
| 2006/0038891 A1 | 2/2006 | Okutomi et al. | |
| 2006/0039611 A1 | 2/2006 | Rother | |
| 2006/0049930 A1 | 3/2006 | Zruya et al. | |
| 2006/0054780 A1 | 3/2006 | Garrood et al. | |
| 2006/0054782 A1 | 3/2006 | Olsen et al. | |
| 2006/0055811 A1 | 3/2006 | Frtiz et al. | |
| 2006/0069478 A1 | 3/2006 | Iwama | |
| 2006/0072029 A1 | 4/2006 | Miyatake et al. | |
| 2006/0087747 A1 | 4/2006 | Ohzawa et al. | |
| 2006/0098888 A1 | 5/2006 | Morishita | |
| 2006/0125936 A1 | 6/2006 | Gruhike et al. | |
| 2006/0138322 A1 | 6/2006 | Costello et al. | |
| 2006/0152803 A1 | 7/2006 | Provitola | |
| 2006/0157640 A1 | 7/2006 | Perlman et al. | |
| 2006/0159369 A1 | 7/2006 | Young | |
| 2006/0176566 A1 | 8/2006 | Boettiger et al. | |
| 2006/0187338 A1 | 8/2006 | May et al. | |
| 2006/0197937 A1 | 9/2006 | Bamji et al. | |
| 2006/0203113 A1 | 9/2006 | Wada et al. | |
| 2006/0210186 A1 | 9/2006 | Berkner | |
| 2006/0239549 A1 | 10/2006 | Kelly et al. | |
| 2006/0243889 A1 | 11/2006 | Farnworth et al. | |
| 2006/0251410 A1 | 11/2006 | Trutna | |
| 2006/0274174 A1 | 12/2006 | Tewinkle | |
| 2006/0278948 A1 | 12/2006 | Yamaguchi et al. | |
| 2006/0279648 A1 | 12/2006 | Senba et al. | |
| 2007/0002159 A1 | 1/2007 | Olsen et al. | |
| 2007/0008575 A1 | 1/2007 | Yu et al. | |
| 2007/0024614 A1 | 2/2007 | Tam | |
| 2007/0036427 A1 | 2/2007 | Nakamura et al. | |
| 2007/0040828 A1 | 2/2007 | Zalevsky et al. | |
| 2007/0040922 A1 | 2/2007 | McKee et al. | |
| 2007/0041391 A1 | 2/2007 | Lin et al. | |
| 2007/0052825 A1 | 3/2007 | Cho | |
| 2007/0083114 A1 | 4/2007 | Yang et al. | |
| 2007/0085917 A1 | 4/2007 | Kobayashi | |
| 2007/0102622 A1 | 5/2007 | Olsen et al. | |
| 2007/0126898 A1 | 6/2007 | Feldman | |
| 2007/0127831 A1 | 6/2007 | Venkataraman | |
| 2007/0139333 A1 | 6/2007 | Sato et al. | |
| 2007/0146511 A1 | 6/2007 | Kinoshita et al. | |
| 2007/0158427 A1 | 7/2007 | Zhu et al. | |
| 2007/0159541 A1 | 7/2007 | Sparks et al. | |
| 2007/0160310 A1 | 7/2007 | Tanida et al. | |
| 2007/0165931 A1 | 7/2007 | Higaki | |
| 2007/0171290 A1 | 7/2007 | Kroger | |
| 2007/0182843 A1 | 8/2007 | Shimamura et al. | |
| 2007/0206241 A1 | 9/2007 | Smith et al. | |
| 2007/0211164 A1 | 9/2007 | Olsen et al. | |
| 2007/0216765 A1 | 9/2007 | Wong et al. | |
| 2007/0228256 A1 | 10/2007 | Mentzer | |
| 2007/0257184 A1 | 11/2007 | Olsen et al. | |
| 2007/0258006 A1 | 11/2007 | Olsen et al. | |

(56) References Cited

U.S. PATENT DOCUMENTS

| | | |
|---|---|---|
| 2007/0258706 A1 | 11/2007 | Raskar et al. |
| 2007/0263114 A1 | 11/2007 | Gurevich et al. |
| 2007/0268374 A1 | 11/2007 | Robinson |
| 2007/0296832 A1 | 12/2007 | Ota et al. |
| 2007/0296835 A1 | 12/2007 | Olsen |
| 2007/0296847 A1 | 12/2007 | Chang et al. |
| 2008/0006859 A1 | 1/2008 | Mionetto et al. |
| 2008/0019611 A1 | 1/2008 | Larkin |
| 2008/0025649 A1 | 1/2008 | Liu et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0112635 A1 | 5/2008 | Kondo et al. |
| 2008/0118241 A1 | 5/2008 | Tekolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0187305 A1 | 8/2008 | Raskar et al. |
| 2008/0193026 A1 | 8/2008 | Horie et al. |
| 2008/0218610 A1 | 9/2008 | Chapman et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0298674 A1 | 12/2008 | Baker et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091806 A1 | 4/2009 | Inuiya |
| 2009/0096050 A1 | 4/2009 | Park |
| 2009/0102956 A1 | 4/2009 | Georgiev |
| 2009/0109306 A1 | 4/2009 | Shan et al. |
| 2009/0128833 A1 | 5/2009 | Yahav |
| 2009/0129667 A1 | 5/2009 | Ho et al. |
| 2009/0140131 A1 | 6/2009 | Utagawa et al. |
| 2009/0152664 A1 | 6/2009 | Klem et al. |
| 2009/0167922 A1 | 7/2009 | Perlman et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan et al. |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone |
| 2009/0274387 A1 | 11/2009 | Jin |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0013927 A1 | 1/2010 | Nixon |
| 2010/0044815 A1 | 2/2010 | Chang et al. |
| 2010/0053342 A1 | 3/2010 | Hwang |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142839 A1 | 6/2010 | Lakus-becker |
| 2010/0157073 A1 | 6/2010 | Kondo et al. |
| 2010/0165152 A1 | 7/2010 | Lim |
| 2010/0166410 A1 | 7/2010 | Chang et al. |
| 2010/0177411 A1 | 7/2010 | Hegde et al. |
| 2010/0194901 A1 | 8/2010 | van Hoorebeke et al. |
| 2010/0195716 A1 | 8/2010 | Klein et al. |
| 2010/0201834 A1 | 8/2010 | Maruyama et al. |
| 2010/0208100 A9 | 8/2010 | Olsen et al. |
| 2010/0220212 A1 | 9/2010 | Perlman et al. |
| 2010/0223237 A1 | 9/2010 | Mishra et al. |
| 2010/0231285 A1 | 9/2010 | Boomer et al. |
| 2010/0244165 A1 | 9/2010 | Lake et al. |
| 2010/0245684 A1* | 9/2010 | Xiao .................... H04N 9/3147 348/745 |
| 2010/0265381 A1 | 10/2010 | Yamamoto et al. |
| 2010/0265385 A1 | 10/2010 | Knight |
| 2010/0281070 A1 | 11/2010 | Chan et al. |
| 2010/0302423 A1 | 12/2010 | Adams, Jr. et al. |
| 2010/0309292 A1 | 12/2010 | Ho et al. |
| 2010/0321595 A1 | 12/2010 | Chiu et al. |
| 2011/0001037 A1 | 1/2011 | Tewinkle |
| 2011/0018973 A1 | 1/2011 | Takayama |
| 2011/0019243 A1 | 1/2011 | Constant, Jr. et al. |
| 2011/0031381 A1 | 2/2011 | Tay et al. |
| 2011/0032370 A1 | 2/2011 | Ludwig |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0069189 A1 | 3/2011 | Venkataraman et al. |
| 2011/0080487 A1 | 4/2011 | Venkataraman et al. |
| 2011/0108708 A1 | 5/2011 | Olsen et al. |
| 2011/0121421 A1 | 5/2011 | Charbon et al. |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0176020 A1 | 7/2011 | Chang |
| 2011/0211077 A1* | 9/2011 | Nayar .................... G02B 26/06 348/207.1 |
| 2011/0211824 A1 | 9/2011 | Georgiev et al. |
| 2011/0221599 A1* | 9/2011 | Hogasten .......... H01L 27/14609 340/632 |
| 2011/0221658 A1 | 9/2011 | Haddick et al. |
| 2011/0221939 A1 | 9/2011 | Jerdev |
| 2011/0221950 A1 | 9/2011 | Oostra |
| 2011/0228144 A1 | 9/2011 | Tian et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |

(56) References Cited

U.S. PATENT DOCUMENTS

| | | |
|---|---|---|
| 2011/0255592 A1 | 10/2011 | Sung et al. |
| 2011/0255745 A1 | 10/2011 | Hodder et al. |
| 2011/0261993 A1 | 10/2011 | Weiming et al. |
| 2011/0267348 A1 | 11/2011 | Lin et al. |
| 2011/0273531 A1 | 11/2011 | Ito et al. |
| 2011/0274366 A1 | 11/2011 | Tardif |
| 2011/0279721 A1 | 11/2011 | Mcmahon |
| 2011/0285866 A1 | 11/2011 | Bhrugumalla et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0317766 A1 | 12/2011 | Lim et al. |
| 2012/0012748 A1 | 1/2012 | Pain et al. |
| 2012/0023456 A1 | 1/2012 | Sun et al. |
| 2012/0026297 A1 | 2/2012 | Sato |
| 2012/0026342 A1 | 2/2012 | Yu et al. |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0062702 A1 | 3/2012 | Jiang et al. |
| 2012/0069235 A1 | 3/2012 | Imai |
| 2012/0105691 A1 | 5/2012 | Waqas et al. |
| 2012/0113413 A1 | 5/2012 | Miahczylowicz-Wolski et al. |
| 2012/0147139 A1 | 6/2012 | Li et al. |
| 2012/0147205 A1* | 6/2012 | Lelescu .............. H04N 13/0029 348/218.1 |
| 2012/0153153 A1 | 6/2012 | Chang et al. |
| 2012/0154551 A1 | 6/2012 | Inoue |
| 2012/0163672 A1 | 6/2012 | McKinnon |
| 2012/0169433 A1 | 7/2012 | Mullins et al. |
| 2012/0170134 A1 | 7/2012 | Bolis et al. |
| 2012/0176479 A1 | 7/2012 | Mayhew et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200734 A1 | 8/2012 | Tang |
| 2012/0219236 A1 | 8/2012 | Ali et al. |
| 2012/0229628 A1 | 9/2012 | Ishiyama et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0262607 A1 | 10/2012 | Shimura et al. |
| 2012/0268574 A1 | 10/2012 | Gidon et al. |
| 2012/0287291 A1 | 11/2012 | Mcmahon et al. |
| 2012/0293695 A1 | 11/2012 | Tanaka |
| 2012/0307099 A1 | 12/2012 | Yahata et al. |
| 2012/0314033 A1 | 12/2012 | Lee et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do |
| 2013/0016885 A1 | 1/2013 | Tsujimoto et al. |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0050504 A1 | 2/2013 | Safaee-Rad et al. |
| 2013/0050526 A1 | 2/2013 | Keelan |
| 2013/0057710 A1 | 3/2013 | Mcmahon |
| 2013/0070060 A1 | 3/2013 | Chatterjee |
| 2013/0076967 A1 | 3/2013 | Brunner et al. |
| 2013/0077880 A1 | 3/2013 | Venkataraman et al. |
| 2013/0077882 A1 | 3/2013 | Venkataraman et al. |
| 2013/0088489 A1 | 4/2013 | Schmeitz et al. |
| 2013/0088637 A1 | 4/2013 | Duparre |
| 2013/0113899 A1 | 5/2013 | Morohoshi et al. |
| 2013/0120605 A1 | 5/2013 | Georgiev et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0147979 A1 | 6/2013 | McMahon et al. |
| 2013/0215108 A1 | 8/2013 | McMahon et al. |
| 2013/0215231 A1 | 8/2013 | Hiramoto et al. |
| 2013/0222556 A1 | 8/2013 | Shimada |
| 2013/0223759 A1 | 8/2013 | Nishiyama et al. |
| 2013/0229540 A1 | 9/2013 | Farina et al. |
| 2013/0230237 A1 | 9/2013 | Schlosser et al. |
| 2013/0259317 A1 | 10/2013 | Gaddy |
| 2013/0265459 A1 | 10/2013 | Duparre et al. |
| 2013/0274923 A1 | 10/2013 | By et al. |
| 2013/0293760 A1 | 11/2013 | Nisenzon et al. |
| 2014/0009586 A1 | 1/2014 | McNamer et al. |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0076336 A1 | 3/2014 | Clayton et al. |
| 2014/0079336 A1 | 3/2014 | Venkataraman et al. |
| 2014/0092281 A1 | 4/2014 | Nisenzon et al. |
| 2014/0104490 A1 | 4/2014 | Hsieh et al. |
| 2014/0118493 A1 | 5/2014 | Sali et al. |
| 2014/0132810 A1 | 5/2014 | McMahon |
| 2014/0146201 A1 | 5/2014 | Knight et al. |
| 2014/0176592 A1 | 6/2014 | Wilburn et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | Mcmahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267890 A1 | 9/2014 | Lelescu et al. |
| 2014/0285675 A1 | 9/2014 | Mullis |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Duparre et al. |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0091900 A1 | 4/2015 | Yang et al. |
| 2015/0122411 A1 | 5/2015 | Rodda et al. |
| 2015/0124113 A1 | 5/2015 | Rodda et al. |
| 2015/0124151 A1 | 5/2015 | Rodda et al. |
| 2016/0165212 A1 | 6/2016 | Mullis |

(56) References Cited

U.S. PATENT DOCUMENTS

FOREIGN PATENT DOCUMENTS

| | | |
|---|---|---|
| EP | 1201407 A2 | 5/2002 |
| EP | 1734766 A2 | 12/2006 |
| EP | 2104334 A1 | 9/2009 |
| EP | 2336816 A2 | 6/2011 |
| JP | 59025483 | 9/1984 |
| JP | 64037177 | 7/1989 |
| JP | 02285772 A | 11/1990 |
| JP | 11142609 A | 5/1999 |
| JP | 11223708 A | 8/1999 |
| JP | 2000209503 A | 7/2000 |
| JP | 2002205310 A | 7/2002 |
| JP | 2002252338 A | 9/2002 |
| JP | 2003094445 A | 4/2003 |
| JP | 2003163938 A | 6/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2006033493 A | 2/2006 |
| JP | 2006047944 A | 2/2006 |
| JP | 2006258930 A | 9/2006 |
| JP | 2007520107 A | 7/2007 |
| JP | 2008055908 A | 3/2008 |
| JP | 2008507874 A | 3/2008 |
| JP | 2008258885 A | 10/2008 |
| JP | 2009132010 A | 6/2009 |
| JP | 2011109484 A | 6/2011 |
| JP | 2013526801 A | 6/2013 |
| JP | 2014521117 A | 8/2014 |
| KR | 1020110097647 A | 8/2011 |
| TW | 200939739 A | 9/2009 |
| WO | 2007083579 A1 | 7/2007 |
| WO | 2008108271 A1 | 9/2008 |
| WO | 2008108926 A1 | 9/2008 |
| WO | 2008150817 A1 | 12/2008 |
| WO | 2009151903 A2 | 12/2009 |
| WO | 2011008443 A2 | 1/2011 |
| WO | 2011055655 A1 | 5/2011 |
| WO | 2011063347 A2 | 5/2011 |
| WO | 2011116203 A1 | 9/2011 |
| WO | 2011063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014150856 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |

OTHER PUBLICATIONS

US 8,964,053, 02/2015, Venkataraman et al. (withdrawn)
US 8,965,058, 02/2015, Venkataraman et al. (withdrawn)
US 9,014,491, 04/2015, Venkataraman et al. (withdrawn)
Extended European Search Report for European Application EP12782935.6, report completed Aug. 28, 2014 Mailed Sep. 4, 2014, 6 Pgs.
Extended European Search Report for European Application EP12804266.0, Report Completed Jan. 27, 2015, Mailed Feb. 3, 2015, 6 Pgs.
Extended European Search Report for European Application EP12835041.0, Report Completed Jan. 28, 2015, Mailed Feb. 4, 2015, 6 Pgs.
International Preliminary Report on Patentability for International Application No. PCT/US2012/059813, International Filing Date Oct. 11, 2012, Search Completed Apr. 15, 2014, 7 pgs.
International Preliminary Report on Patentability for International Application No. PCT/US2013/059991, Report Issued Mar. 17, 2015, Mailed Mar. 26, 2015, 8 pgs.
International Preliminary Report on Patentability for International Application No. PCT/US2013/056065, Report Issued Feb. 24, 2015, Mailed Mar. 5, 2015, 4 Pgs.
International Preliminary Report on Patentability for International Application No. PCT/US2013/062720, Report Issued Mar. 31, 2015, Mailed Apr. 9, 2015, 8 Pgs.
International Preliminary Report on Patentability for International Application No. PCT/US2013/024987, Mailed Aug. 21, 2014, 13 Pgs.
International Preliminary Report on Patentability for International Application No. PCT/US2013/027146, International Filing Date Feb. 21, 2013, Report Completed Apr. 2, 2013, Report Issued Aug. 26, 2014, 10 pages.
International Preliminary Report on Patentability for International Application No. PCT/US2013/039155, report completed Nov. 4, 2014, Mailed Nov. 13, 2014, 10 Pgs.
International Preliminary Report on Patentability for International Application No. PCT/US2013/046002, Report Issued Dec. 31, 2014, Mailed Jan. 8, 2015, 6 Pgs.
International Preliminary Report on Patentability for International Application No. PCT/US2013/048772, Report issued Dec. 31, 2014, Mailed Jan. 8, 2015, 8 Pgs.
International Preliminary Report on Patentability for International Application No. PCT/US2013/056502, Report Issued Feb. 24, 2015, Mailed Mar. 5, 2015, 7 Pgs.
International Preliminary Report on Patentability for International Application No. PCT/US2013/069932, Report issued May 19, 2015, Mailed May 28, 2015, 12 Pgs.
International Preliminary Report on Patentability for International Application No. PCT/US2014/022774, Report issued Sep. 22, 2015, Mailed Oct. 1, 2015, 5 Pgs.
International Preliminary Report on Patentability for International Application PCT/US2014/023762, Report issued Mar. 2, 2015, Mailed Mar. 9, 2015, 10 Pgs.
International Search Report and Written Opinion for International Application No. PCT/US2013/046002, Search completed Nov. 13, 2013, Mailed Nov. 29, 2013, 7 pgs.
International Search Report and Written Opinion for International Application No. PCT/US2013/056065, Search Completed Nov. 25, 2013, Mailed Nov. 26, 2013, 8 pgs.
International Search Report and Written Opinion for International Application No. PCT/US2013/059991, Search Completed Feb. 6, 2014, Mailed Feb. 26, 2014, 8 pgs.
International Search Report and Written Opinion for International Application No. PCT/US2011/64921, Report Completed Feb. 25, 2011, mailed Mar. 6, 2012, 17 pgs.

(56) References Cited

OTHER PUBLICATIONS

International Search Report and Written Opinion for International Application No. PCT/US2013/024987, Search Completed Mar. 27, 2013, Mailed Apr. 15, 2013, 14 pgs.
International Search Report and Written Opinion for International Application No. PCT/US2013/027146, completed Apr. 2, 2013, 11 pgs.
International Search Report and Written Opinion for International Application No. PCT/US2013/039155, Search completed Jul. 1, 2013, Mailed Jul. 11, 2013, 11 Pgs.
International Search Report and Written Opinion for International Application No. PCT/US2013/048772, Search Completed Oct. 21, 2013, Mailed Nov. 8, 2013, 11 pgs.
International Search Report and Written Opinion for International Application No. PCT/US2013/056502, Search Completed Feb. 18, 2014, Mailed Mar. 19, 2014, 7 pgs.
International Search Report and Written Opinion for International Application No. PCT/US2013/069932, International Filing Date Nov. 13, 2013, Search Completed Mar. 14, 2014, Mailed Apr. 14, 2014, 12 pgs.
International Search Report and Written Opinion for International Application No. PCT/US2015/019529, Search completed May 5, 2015, Mailed Jun. 8, 2015, 10 Pgs.
International Search Report and Written Opinion for International Application No. PCT/US2011/036349, mailed Aug. 22, 2011, 11 pgs.
International Search Report and Written Opinion for International Application No. PCT/US2013/062720, report completed Mar. 25, 2014, Mailed Apr. 21, 2014, 9 Pgs.
International Search Report and Written Opinion for International Application No. PCT/US2014/024903 report completed Jun. 12, 2014, Mailed, Jun. 27, 2014, 13 pgs.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rajan, Deepu et al., "Simultaneous Estimation of Super Resolved Scene and Depth Map from Low Resolution Defocused Observations", IEEE Computer Society, vol. 25, No. 9; Sep. 2003; pp. 1-16.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al., "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation—theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Seitz et al., "Plenoptic Image Editing", International Journal of Computer Vision 48, 2, pp. 115-129.
Shum et al.,"Pop-Up Light Field: An Interactive Image-Based Modeling and Rendering System", Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5, 2014.
Stollberg et al.,"The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", Source and date unknown, 8 pgs.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Color imaging with an integrated compound imaging system", Optics Express, Sep. 8, 2003, vol. 11, No. 18, pp. 2109-2117.
Taylor, "Virtual camera movement: The way of the future?", American Cinematographer 77, Sep. 1996, 93-100.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Veilleux, "CCD Gain Lab: The Theory", University of Maryland, College Park—Observational Astronomy (ASTR 310), Oct. 19, 2006, Retrieved from <URL: http://www.astro.umd.edu/~veilleux/ASTR310/fall06/ccd_theory.pdf> on May 13, 2014, 5 pgs.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008.
Wang, "Calculation of Image Position, Size and Orientation Using First Order Properties", 10 pgs.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)", http://en.wikipedia.org/wiki/Polarizing_filter_(photography), 1 pg.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al.,"High-Speed Videography Using a Dense Camera Array", Proceeding, CVPR'04 Proceedings of the 2004 IEEE Computer Society Conference on Computer Vision and Pattern Recognition, pp. 294-301.
Wilburn et al.,"The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Yang et al., "A Real-Time Distributed Light Field Camera", Eurographics Workshop on Rendering (2002), pp. 1-10.
Yang et al., "Superresolution Using Preconditioned Conjugate Gradient Method", Source and date unknown, 8 pgs.
Zhang, Qiang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
Zhang et al., "A Self-Reconfigurable Camera Array", Eurographics Symposium on Rendering, 2004, 12 pgs.
Zomet et al., "Robust Super-Resolution", IEEE, 2001, pp. 1-6.
Duparre et al., "Microoptical artificial compound eyes—from design to experimental verification of two different concepts", Proc. of SPIE, Optical Design and Engineering II, vol. 5962, pp. 59622A-1-59622A-12.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.

(56) References Cited

OTHER PUBLICATIONS

Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Ultra-Thin Camera Based on Artificial Appositstion Compound Eyes", 10th Microoptics Conference, Sep. 1-3, 2004, 2 pgs.
Fanaswala, "Regularized Super-Resolution of Multi-View Images", Retrieved from http://www.site.uottawa.ca/-edubois/theses/Fanaswala_thesis.pdf on Nov. 10, 2012, 163 pgs.
Farrell et al., "Resolution and Light Sensitivity Tradeoff with Pixel Size", Proceedings of the SPIE Electronic Imaging 2006 Conference, 2006, vol. 6069, 8 pgs.
Farsiu et al., "Advances and Challenges in Super-Resolution", International Journal of Imaging Systems and Technology, 2004, vol. 14, pp. 47-57.
Farsiu et al., "Fast and Robust Multiframe Super Resolution", IEEE Transactions on Image Processing, Oct. 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., "Optical System Design", 2nd Edition, SPIE Press, pp. 191-198.
Fischer et al., "Optical System Design", 2nd Edition, SPIE Press, pp. 49-58.
Goldman et al., "Video Object Annotation, Navigation, and Composition", In Proceedings of UIST 2008, pp. 3-12.
Gortler et al., "The Lumigraph", In Proceedings of SIGGRAPH 1996, pp. 43-54.
Hacohen et al., "Non-Rigid Dense Correspondence with Applications for Image Enhancement", ACM Transactions on Graphics, 30, 4, 2011, pp. 70:1-70:10.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, vol. 16, No. 12, pp. 2953-2964.
Hasinoff et al., "Search-and-Replace Editing for Personal Photo Collections", Computational Photography (ICCP) 2010, pp. 1-8.
Horisaki et al., "Irregular Lens Arrangement Design to Improve Imaging Performance of Compound-Eye Imaging Systems", Applied Physics Express, 2010, vol. 3, pp. 022501-1-022501-3.
Horisaki et al., "Superposition Imaging for Three-Dimensionally Space-Invariant Point Spread Functions", Applied Physics Express, 2011, vol. 4, pp. 112501-1-112501-3.
Horn et al., "LightShop: Interactive Light Field Manipulation and Rendering", In Proceedings of I3D 2007, pp. 121-128.
Isaksen et al., "Dynamically Reparameterized Light Fields", In Proceedings of SIGGRAPH 2000, pp. 297-306.
Jarabo et al., "Efficient Propagation of Light Field Edits", In Proceedings of SIACG 2011, pp. 75-80.

Joshi et al., "Synthetic Aperture Tracking: Tracking Through Occlusions", I CCV IEEE 11th International Conference on Computer Vision; Oct. 2007, Retrieved from http:l/ieeexplore.ieee.org/stamp/stamp.jsp?tp=&arnumber=4409032&isnumber=4408819 on Jul. 28, 2014, pp. 1-8.
Kang et al., "Handling Occlusions inn Dense Multi-View Stereo", Computer Vision and Pattern Recognition, 2001, vol. 1, pp. I-103-I-110.
Kitamura et al., "Reconstruction of a high-resolution image on a compound-eye image-capturing system", Applied Optics, Mar. 10, 2004, vol. 43, No. 8, pp. 1719-1727.
Krishnamurthy et al., "Compression and Transmission of Depth Maps for Image-Based Rendering", Image Processing, 2001, pp. 828-831.
Kutulakos et al., "Occluding Contour Detection Using Affine Invariants and Purposive Viewpoint Control", Proc., CVPR 94, 8 pgs.
Lai et al., "A Large-Scale Hierarchical Multi-View RGB-D Object Dataset", May 2011, 8 pgs.
Lee et al., "Electroactive Polymer Actuator for Lens-Drive Unit in Auto-Focus Compact Camera Module", ETRI Journal, vol. 31, No. 6, Dec. 2009, pp. 695-702.
LensVector, "How LensVector Autofocus Works", printed Nov. 2, 2012 from http://www.lensvector.com/overview.html, 1 pg.
Levin et al., "A Closed Form Solution to Natural Image Matting", Pattern Analysis and Machine Intelligence, Feb. 2008, vol. 30, 8 pgs.
Levoy, "Light Fields and Computational Imaging", IEEE Computer Society, Aug. 2006, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Liu et al., "Virtual View Reconstruction Using Temporal Information", IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Mitra et al., "Light Field Denoising, Light Field Superresolution and Stereo Camera Based Refocussing using a GMM Light Field Patch Prior", Computer Vision and Pattern Recognition Workshops (CVPRW), IEEE Computer Society Conference on Jun. 16-21, 2012, pp. 22-28.
Moreno-Noguer, Francese et al. "Active Refocusing of Images and Videos", ACM SIGGRAPH, 2007, vol. 26, pp. 1-10, Retrieved from http://doi.acm.org/1 0.1145/1276377.1276461 on Jul. 8, 2015.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Perwass et al., "Single Lens 3D-Camera with Extended Depth-of-Field", printed from www.raytrix.de, Jan. 2012, 15 pgs.
Pham et al., "Robust Super-Resolution without Regularization", Journal of Physics: Conference Series 124, 2008, pp. 1-19.
Polight, "Designing Imaging Products Using Reflowable Autofocus Lenses", http://www.polight.no/tunable-polymer-autofocus-lens-html--11.html.

(56) References Cited

OTHER PUBLICATIONS

Pouydebasquea et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Tanida, Jun et al., "Thin observation module by bound optics (TOMBO): concept and experimental verification", Applied Optics, Apr. 10, 2001, vol. 40, No. 11, pp. 1806-1813.
International Search Report and Written Opinion for International Application No. PCT/US2014/017766, report completed May 28, 2014, Mailed Jun. 18, 2014, 9 Pgs.
International Search Report and Written Opinion for International Application No. PCT/US2014/018084, Report completed May 23, 2014, Mailed Jun. 10, 2014, 12 pgs.
International Search Report and Written Opinion for International Application No. PCT/US2014/018116, report completed May 13, 2014, Mailed Jun. 2, 2014, 12 Pgs.
International Search Report and Written Opinion for International Application No. PCT/US2014/022118, report completed Jun. 9, 2014, Mailed Jun. 25, 2014, 5 pgs.
International Search Report and Written Opinion for International Application No. PCT/US2014/022774 report completed Jun. 9, 2014, Mailed Jul. 14, 2014, 6 Pgs.
International Search Report and Written Opinion for International Application No. PCT/US2014/024407, report completed Jun. 11, 2014, Mailed Jul. 8, 2014, 9 Pgs.
International Search Report and Written Opinion for International Application No. PCT/US2014/025100, report completed Jul. 7, 2014, Mailed Aug. 7, 2014, 5 Pgs.
International Search Report and Written Opinion for International Application No. PCT/US2014/025904 report completed Jun. 10, 2014, Mailed Jul. 10, 2014, 6 Pgs.
International Search Report and Written Opinion for International Application No. PCT/US2009/044687, completed Jan. 5, 2010, 13 pgs.
International Search Report and Written Opinion for International Application No. PCT/US2010/057661, completed Mar. 9, 2011, 14 pgs.
International Search Report and Written Opinion for International Application No. PCT/US2012/044014, completed Oct. 12, 2012, 15 pgs.
International Search Report and Written Opinion for International Application No. PCT/US2012/056151, completed Nov. 14, 2012, 10 pgs.
International Search Report and Written Opinion for International Application No. PCT/US2012/059813, Report completed Dec. 17, 2012, 8 pgs.
International Search Report and Written Opinion for International Application No. PCT/US2012/037670, Mailed Jul. 18, 2012, Report Completed Jul. 5, 2012, 9 pgs.
International Search Report and Written Opinion for International Application No. PCT/US2012/058093, Report completed Nov. 15, 2012, 12 pgs.
International Search Report and Written Opinion for International Application No. PCT/US2014/022123, report completed Jun. 9, 2014, Mailed Jun. 25, 2014, 5 pgs.
International Search Report and Written Opinion for International Application No. PCT/US2014/024947, Report Completed Jul. 8, 2014, Mailed Aug. 5, 2014, 8 Pgs.
International Search Report and Written Opinion for International Application No. PCT/US2014/028447, report completed Jun. 30, 2014, Mailed Jul. 21, 2014, 8 Pgs.
International Search Report and Written Opinion for International Application No. PCT/US2014/030692, report completed Jul. 28, 2014, Mailed Aug. 27, 2014, 7 Pages.
International Search Report and Written Opinion for International Application No. PCT/US2014/064693, Report Completed Mar. 7, 2015, Mailed Apr. 2, 2015, 15 pgs.
International Search Report and Written Opinion for International Application No. PCT/US2014/066229, Search Completed Mar. 6, 2015, Mailed Mar. 19, 2015, 9 Pgs.
International Search Report and Written Opinion for International Application No. PCT/US2014/067740, Report Completed Jan. 29, 2015, Mailed Mar. 3, 2015, 10 pgs.
International Search Report and Written Opinion for International Application No. PCT/US2014/023762, Report Completed May 30, 2014, Mailed Jul. 3, 2014, 6 Pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, pp. 186-200.
Bishop et al., "Light Field Superresolution", Retrieved from http://home.eps.hw.ac.uk/~sz73/ICCP09/LightFieldSuperresolution.pdf, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.
Borman et al., "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, 3653, 10 pgs.
Borman et al., "Image Resampling and Constraint Formulation for Multi-Frame Super-Resolution Restoration", Proc. SPIE, Jun. 2003, 5016, 12 pgs.
Borman et al., "Linear models for multi-frame super-resolution restoration under non-affine registration and spatially varying PSF", Proc. SPIE, May 2004, vol. 5299, 12 pgs.
Borman et al.,"Nonlinear Prediction Methods for Estimation of Clique Weighting Parameters in NonGaussian Image Models", Proc. SPIE, 1998. 3459, 9 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al.,"Super-Resolution from Image Sequences—A Review", Circuits & Systems, 1998, pp. 374-378.
Bose et al.,"Superresolution and Noise Filtering Using Moving Least Squares", IEEE Transactions on Image Processing, date unknown, 21 pgs.
Boye et al., "Comparison of Subpixel Image Registration Algorithms", Proc. of SPIE-IS&T Electronic Imaging, vol. 7246, pp. 72460X-1-72460X-9.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, 2010, 11 pgs.
Bruckner et al., "Thin wafer-level camera lenses inspired by insect compound eyes", Optics Express, Nov. 22, 2010, vol. 18, No. 24, pp. 24379-24394.
Capel, "Image Mosaicing and Super-resolution", Retrieved from http://citeseerx.ist.psu.edu/viewdoc/download?doi=1 0.1.1.226.2643&rep=rep1&type=pdf on Nov. 10, 2012, pp. 1-263 (269 total pages).
Chan et al., "Extending the Depth of Field in a Compound-Eye Imaging System with Super-Resolution Reconstruction", Proceedings—International Conference on Pattern Recognition, 2006, vol. 3, pp. 623-626.
Chan et al., "Investigation of Computational Compound-Eye Imaging System with Super-Resolution Reconstruction", IEEE, ISASSP 2006, pp. 1177-1180.
Chan et al., "Super-resolution reconstruction in a computational compound-eye imaging system", Multidim Syst Sign Process, 2007, vol. 18, pp. 83-101.

(56) References Cited

OTHER PUBLICATIONS

Chen et al., "Interactive deformation of light fields", In Proceedings of SIGGRAPH I3D 2005, pp. 139-146.
Chen et al.,"KNN Matting", IEEE Transactions on Pattern Analysis and Machine Intelligence, Sep. 2013, vol. 35, No. 9, pp. 2175-2188.
Drouin et al., "Fast Multiple-Baseline Stereo with Occlusion", Proceedings of the Fifth International Conference on 3-D Digital Imaging and Modeling, 2005, 8 pgs.
Drouin et al., "Geo-Consistency for Wide Multi-Camera Stereo", Proceedings of the 2005 IEEE Computer Society Conference on Computer Vision and Pattern Recognition, 2005, 8 pgs.
Drouin et al., "Improving Border Localization of Multi-Baseline Stereo Using Border-Cut", International Journal of Computer Vision, Jul. 2009, vol. 83, Issue 3, 8 pgs.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, 2006, vol. 1, pp. R1-R16.

* cited by examiner

SYSTEM AND METHODS FOR CALIBRATION OF AN ARRAY CAMERA

CROSS-REFERENCE TO RELATED APPLICATIONS

The current application is a continuation of U.S. application Ser. No. 14/203,308 entitled "System and Methods for Calibration of an Array Camera", filed Mar. 10, 2014, which application claims priority to U.S. Provisional Patent Application No. 61/780,748 entitled "System and Methods for Calibration of an Array Camera," filed Mar. 13, 2013, the disclosures of which are incorporated herein by reference.

FIELD OF THE INVENTION

The present invention relates to calibration of an array camera. More particularly, this invention relates to systems and methods for calibrating an array camera to detect defects in individual imaging components of the array camera and to gather information that can be utilized to perform image processing with image data from the imaging components in an array camera.

BACKGROUND

An array camera is a camera that is made up of multiple imaging components. Each individual imaging component captures data for a two dimensional image of a view. For purposes of this discussion, an imaging component is an individual camera and/or circuitry including an array of pixels that capture data for a two dimensional image of the view. The data of the two-dimensional images can be used to produce super-resolution (SR) images and other types of images of the view using some or all of the data from the various two dimensional images captured by the individual imaging components.

During the manufacture of most digital cameras (including array cameras) and each imaging component of an array camera, a calibration process is typically performed. In a conventional camera or imaging component, the calibration process typically measures a number of characteristics of the imaging component that must be quantified to ensure effective image processing. The calibration of an array camera requires specialized calibration processes to quantify certain characteristics unique to an array camera and not particularly common in conventional digital cameras or imaging components, such as, the uniformity of various intrinsic characteristics among the elements of the array and the extrinsic geometric relationships between the elements of the array.

One aspect of an array camera that is different from conventional cameras is that some types of defects in pixels of an individual imaging component may be compensated for during image processing by using information collected from another imaging component in the array. Thus, an array camera is more tolerant of defects in the individual imaging components.

SUMMARY OF THE INVENTION

Systems and methods in accordance with embodiments of this invention enable calibration of array cameras. In accordance with embodiments of this invention, one or more of the imaging components of the array camera are designated as a reference imaging component and each of the remaining imaging components in the array camera is an associate imaging component. Each of the associate imaging components is associated with at least one of the reference imaging components. In accordance with embodiments of the invention, the calibration of an array camera includes performing a defect detection process and a geometric calibration process. The defect detection process identifies pixel defects in each of the imaging components in the array camera and determines whether the identified pixel defects in a particular imaging component may be corrected in image processing using image data from at least one other one of the plurality of imaging components. The geometric calibration process determines translation information that relates image data from particular pixels in a reference imaging component to image data from corresponding pixels in each associate imaging component associated with the reference imaging component.

In accordance with some embodiments of the invention, the calibration process also includes a Modulation Transfer Function (MTF) calibration process that is performed on each of the imaging components in the array camera to determine MTF data over the Field of View (FoV) or the Field Height (FH) for each of the imaging components. The MTF calibration process includes capturing image data of a target with each of the imaging components and analyzing the image data captured by each of imaging components to determine MTF data over one of a FoV and FH for each of the imaging components in accordance with a number of embodiments. The MTF data for each of the imaging components is determined from the MTF detected in the image data and is stored in memory.

In accordance with many embodiments of the invention, the calibration process also includes a photometric calibration process performed for each of the plurality of imaging components in the array camera. The photometric calibration process determining image data adjustments for each of the imaging components to provide image data from each of the imaging components with a uniform intensity profile. In accordance with a number of embodiments, the photometric calibration is performed in the following manner. Image data of a flat field target under controlled lighting conditions is captured with each of the imaging components in the array camera. The captured image data from each of the imaging components is analyzed to determine a per pixel adjustment needed to match cos ^4 fall-off response for an image and a grid of adjustments is generated for each of the imaging components. Each adjustment in the grid indicates the adjustment information for data from a set of pixels in a particular imaging component needed to match the cos ^4 fall-off response for an image.

In accordance with some embodiments of the invention, the defects in each of the imaging components are identified in the following manner. A first set of image data of a field target under high intensity lighting is captured with each of the imaging components. A second set of image data of a field target under low intensity lighting is also captured with each of the imaging components. For each imaging component, the first and second sets of image data are analyzed to identify each pixel having an unexpected response value. The identified pixels are flagged with a category indicating the category unexpected response received and the identified pixels and flagged categories of the pixels are stored. In accordance with a number of embodiments, the detecting of defects in each imaging component further determining the number of each category of defects identified in each imaging component, comparing the number of each category of defects in each imaging component to a threshold, and generating a disposition output for a particular imaging component in response to the number of defects in a category for the particular imaging component being greater than the threshold.

In accordance with some embodiments, the determining of whether a defect may be corrected during image processing is performed in the following manner. A defect a first imaging component in the array camera is selected and a parallax translation path for the defect over a range of supported distances is determined. A parallax translation path over the range of supported distances from each defect in other imaging components of the array camera is also determined. A determination is made as to whether a predetermined number of parallax translation paths of defects in other imaging components intersect the parallax translation path of the selected defect. A disposition output for the first imaging component is generated if a predetermined number of parallax translation paths for defects from other images components intersect the parallax translation path of the selected defect.

DETAILED DESCRIPTION

Figure 1:
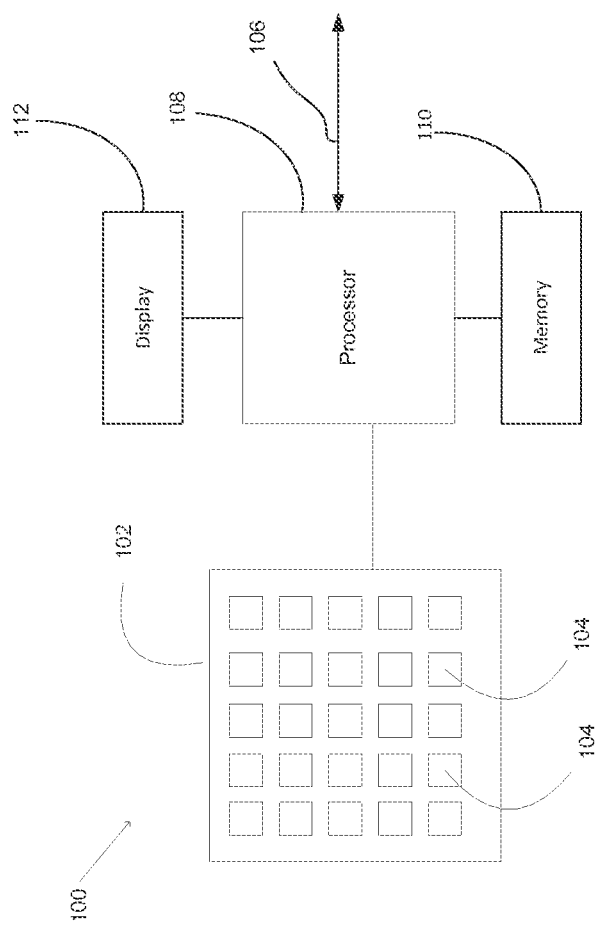
FIG. 1 conceptually illustrates an array camera in accordance with an embodiment of this invention.

Turning now to the drawings, systems and methods for performing a calibration process for an array camera to detect potential defects in the imaging components and to gather information that can be utilized during image processing in accordance with embodiments of the invention are illustrated. In accordance with many embodiments of the invention, at least one of the imaging components in the array camera is designated as a "master" or "reference" imaging component; and each of the remaining imaging components in the array is an associate imaging component. Each associate imaging component is associated with at least one of the reference imaging components. During use, the reference imaging component can be utilized to capture a reference image and associate imaging components can capture alternate view images that can be utilized in combination with the reference image to synthesize a higher resolution image from the viewpoint of the reference imaging component. In several embodiments, a calibration process is performed to determine relevant information about each imaging component including (but not limited to) colorimetric, MTF, and photometric information. A calibration process may also determine geometric information that relates image data collected by the imaging components to the image data collected by other imaging components to assist in integrating the image data during image processing. The calibration process may also identify defects in particular imaging arrays and gather information that may be used to correct the identified defects during image processing.

Capturing Light Field Image Data

A light field, which is often defined as a 4D function characterizing the light from all direction at all points in a scene, can be interpreted as a two-dimensional (2D) collection of data from 2D images of a scene. Array cameras, such as those described in U.S. patent application Ser. No. 12/935,504 entitled "Capturing and Processing of Images using Monolithic Array camera with Heterogeneous Imagers" to Venkataraman et al., can be utilized to capture light field images. In a number of embodiments, super-resolution processes such as those described in U.S. patent application Ser. No. 12/967,807 entitled "Systems and Methods for Synthesizing High Resolution Images Using Super-Resolution Processes" to Lelescu et al., are utilized to synthesize a higher resolution 2D image or a stereo pair of higher resolution 2D images from the lower resolution image data in the light field captured by the imaging components in an array camera. The terms high or higher resolution and low or lower resolution are used here in a relative sense and not to indicate the specific resolutions of the images captured by the array camera. The super-resolution processing techniques described in U.S. patent application Ser. No. 12/967,807 can utilize a variety of calibration information including scene independent geometric corrections related to the distortions introduced by the construction of the imaging components utilized to capture the lower resolution image data. Scene independent distortions introduced by the imaging components of an array camera can limit the fidelity of a higher resolution image generated by super-resolution imaging due to uncertainty concerning the relevant location within the scene of a piece of image data. By measuring the distortions during calibration, the uncertainty introduced by the distortions can be reduced, improving the performance of the super-resolution process. In a similar manner, colorimetric, MTF, and photometric variations between similar imaging components in a array camera can complicate image processing by increasing the difficulty of identifying similar points within a scene in the image data captured by the imaging components. The disclosures of U.S. patent application Ser. No. 12/935,504 and U.S. patent application Ser. No. 12/967,807 are hereby incorporated by reference in their entirety.

Each two-dimensional (2D) image in a captured light field is from the viewpoint of one of the imaging components in the array camera. A high resolution image synthesized using super-resolution processing is synthesized from a specific viewpoint that can be referred to as a reference viewpoint. The reference viewpoint can be from the viewpoint of one of the imaging components in an array camera. Alternatively, the reference viewpoint can be an arbitrary virtual viewpoint.

Due to the different viewpoint of each of the imaging components, parallax results in variations in the position of foreground objects within the image data of the scene from the various imaging components of the array camera. Processes for performing parallax detection are discussed in U.S. Provisional Patent Application Ser. No. 61/691,666 entitled "Systems and Methods for Parallax Detection and Correction in Images Captured Using Array Cameras" to Venkataraman et al., the disclosure of which is incorporated by reference herein in its entirety. As is disclosed in U.S. Provisional Patent Application Ser. No. 61/691,666, a depth map from a reference viewpoint can be generated by determining the disparity between the pixels in the images within a light field due to parallax. A depth map indicates the distance of the surfaces of scene objects from a reference viewpoint. In a number of embodiments, the computational complexity of generating depth maps is reduced by generating an initial low resolution depth map and then increasing the resolution of the depth map in regions where additional depth information is desirable such as (but not limited to) regions involving depth transitions and/or regions containing pixels that are occluded in one or more images within the light field.

During super-resolution processing, a depth map can be utilized in a variety of ways. U.S. patent application Ser. No. 12/967,807 describes how a depth map can be utilized during super-resolution processing to dynamically refocus a synthesized image to blur the synthesized image to make portions of the scene that do not lie on the focal plane to appear out of focus. U.S. patent application Ser. No. 12/967,807 also describes how a depth map can be utilized during super-resolution processing to generate a stereo pair of higher resolution images for use in 3D applications. A depth map can also be utilized to synthesize a high resolution image from one or more virtual viewpoints. In this way, a rendering device can simulate motion parallax and dolly zoom. In addition to utilizing a depth map during super-resolution processing, a depth map can be utilized in a variety of post processing processes to achieve effects including (but not limited to) dynamic refocusing, generation of stereo pairs, and generation of virtual viewpoints without performing super-resolution processing.

Array Camera Architecture

Array cameras in accordance with embodiments of the invention are configured so that the array camera software can control the capture of light field image data and can capture the light field image data into a file that can be used to render one or more images on any of a variety of appropriately configured rendering devices. An array camera including an array of imaging components in accordance with an embodiment of the invention is illustrated in FIG. 1. The array camera 100 includes an array camera module 102, a processor 108, a memory 110 and a display 112. The array camera module 102 includes an array of imaging components 104 formed by a sensor and a lens stack array and the array camera module 102 is configured to communicate with a processor 108. The processor 108 is also configured to communicate with one or more different types of memory 110 that can be utilized to store image data and/or contain machine readable instructions utilized to configure the processor to perform processes including (but not limited to) the various processes described below. The processor 108 may also be connected to a network via a network connection 106 to communicate with other processing systems connected to the network. The display 112 can be utilized by the processor 108 to present a user interface to a user and to display an image rendered using the light field image data. Although the processor is illustrated as a single processor, array cameras in accordance with embodiments of the invention can utilize a single processor or multiple processors including (but not limited to) a graphics processing unit (GPU).

In the illustrated embodiment, the processor 108 receives image data generated by the array camera module 102 and reconstructs the light field captured by the array camera module 102 from the image data. Sensors including multiple focal planes that can be utilized in the construction of array camera modules are discussed in U.S. patent application Ser. No. 13/106,797 entitled "Architectures for System on Chip Array Cameras", to Pain et al., the disclosure of which is incorporated herein by reference in its entirety. The processor 108 can manipulate the light field in any of a variety of different ways including (but not limited to) determining the depth and visibility of the pixels in the light field and synthesizing higher resolution 2D images from the image data of the light field.

In the illustrated embodiment, the imaging components 104 are configured in a 5×5 array. Each imaging component 104 in the array camera module 102 is capable of capturing an image of the view. The sensor elements utilized in the imaging components 104 can be individual light sensing elements such as, but not limited to, traditional CIS (CMOS Image Sensor) pixels, CCD (charge-coupled device) pixels, high dynamic range sensor elements, multispectral sensor elements and/or any other structure configured to generate an electrical signal indicative of light incident on the structure. In many embodiments, the sensor elements of the imaging components 104 have similar physical properties and receive light via the same optical channel and color filter (where present). In other embodiments, the sensor elements of the imaging components 104 have different characteristics and, in many instances, the characteristics of the sensor elements are related to the color filter applied to each sensor element. In several embodiments, the sensor elements of an imaging component includes a plurality of rows of pixels that also form a plurality of columns of pixels and the pixels of each imaging component are contained within a region of the sensor that does not contain pixels from another imaging component.

In many embodiments, an array of images (i.e. a light field) is created using the image data captured by the imaging components 104. As noted above, the processor 108 in accordance with many embodiments of the invention is configured using appropriate software to take the image data within the light field and synthesize one or more high resolution images. In several embodiments, the high resolution image is synthesized from a reference viewpoint, typically the viewpoint of a reference imaging component 104 within the array camera module 102. In many embodiments, the processor is able to synthesize an image from a virtual viewpoint, which does not correspond to the viewpoints of any of the imaging components 104 in the array camera module 102. Unless all of the objects within a captured scene are a significant distance from the array camera, the images in the light field will include disparity due to the different fields of view of the focal planes used to capture the images. Processes for detecting and correcting for disparity when performing super-resolution processing in accordance with embodiments of the invention are discussed in U.S. Provisional Patent Application Ser. No. 61/691,666 (incorporated by reference above). The detected disparity can be utilized to generate a depth map. The high resolution image and depth map can be encoded and stored in memory 110 in a light field image file. The processor 108 can use the light field image file to render one or more high resolution images. The processor 108 can also coordinate the sharing of the light field image file with other devices (e.g.

via a network connection), which can use the light field image file to render one or more high resolution images.

Although a specific array camera architecture is illustrated in FIG. 1, systems and methods for performing calibration of an array camera in accordance with embodiments of the invention may be performed on any array camera configuration appropriate to the requirements of a specific application. Systems and methods for performing a calibration process for an array camera in accordance with embodiments of the invention are discussed below.

Calibration Process for an Array Camera

Figure 2:
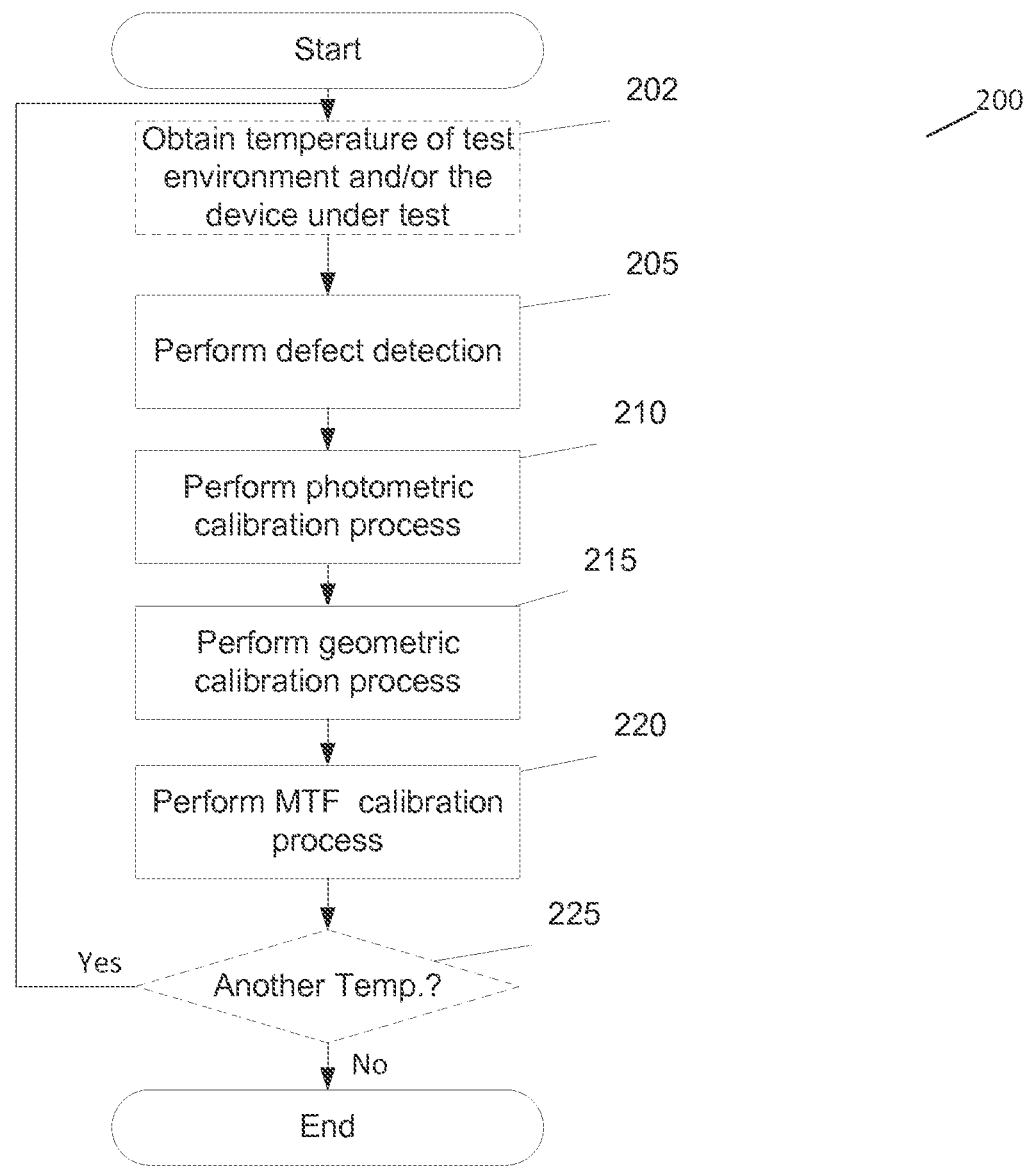
FIG. 2 illustrates a flow diagram of a calibration process for an array camera in accordance with embodiments of this invention.

An array camera has features beyond those in a conventional camera that are characterized during a calibration process to assist super-resolution processing algorithms to produce images of a desired resolution. During a manufacture process and/or periodically during the life of an array camera, a calibration process may be performed to generate or update information that can be utilized to perform the super-resolution processing algorithms. A calibration process to collect the calibration information in accordance with embodiments of this invention is illustrated in FIG. 2.

A Calibration process (200) can involve performing a defect detection process (205), a photometric calibration process (210), a geometric calibration process (215), and/or a MTF calibration process (220). One skilled in the art will recognize that a calibration process may include other processes for detecting other types of defects and/or to collect information about other aspects of the array camera and the underlying imaging components if other types of information are needed to perform the image processing algorithms without departing from this invention. The defect detection process (205) is performed to identify pixels in each of the imaging components that have defects and to determine how information from a defective pixel is to be handled during image processing. A defect detection process in accordance with some embodiments of this invention is described below with reference to FIGS. 3 and 4. The photometric calibration process (210) determines information used during image processing to adjust the data of a view captured by each of the imaging components so that the data of the view received from each of the imaging components has a uniform intensity profile. A photometric process performed in accordance with some embodiments of this invention is discussed below with reference to FIG. 5. The geometric calibration process (215) determines the information used to perform a translation to align image data from pixels in each associate imaging component with image data from corresponding pixels in a reference imaging component. A geometric calibration process performed in accordance with some embodiments of this invention is described below with reference to FIG. 6. The MTF calibration process (220) is performed to characterize the "sharpness" of the optics over the FoV of each imaging component in order to adjust the data from each of the imaging components to cause the image data from the various imaging components to have an essentially uniform MTF. A MTF calibration process performed in accordance with some embodiments of this invention is described below with reference to FIG. 7.

Furthermore, calibration process 200 and/or each of the individual calibration/error detection processes included in process 200 may be performed one or more times at each of several predetermined temperatures and the results may be aggregated into calibration information that is indexed by temperature in accordance with a number of embodiments of this invention. In accordance with these embodiments, the temperature of the environment and/or the array camera being tested at the time of an iteration of the process 200 is optionally determined (202). The temperature may be measured by a connected device such as, but not limited to, a dark sensor or may be input by an operator depending on the embodiment. The determined temperature is associated with the information generated during the iteration. Furthermore, process 200 may determine whether additional iterations need to be performed at other temperatures (225). If so, process 200 is repeated after the temperature of a test environment is adjusted. Otherwise process 200 ends.

Defect Detection

Figure 3:
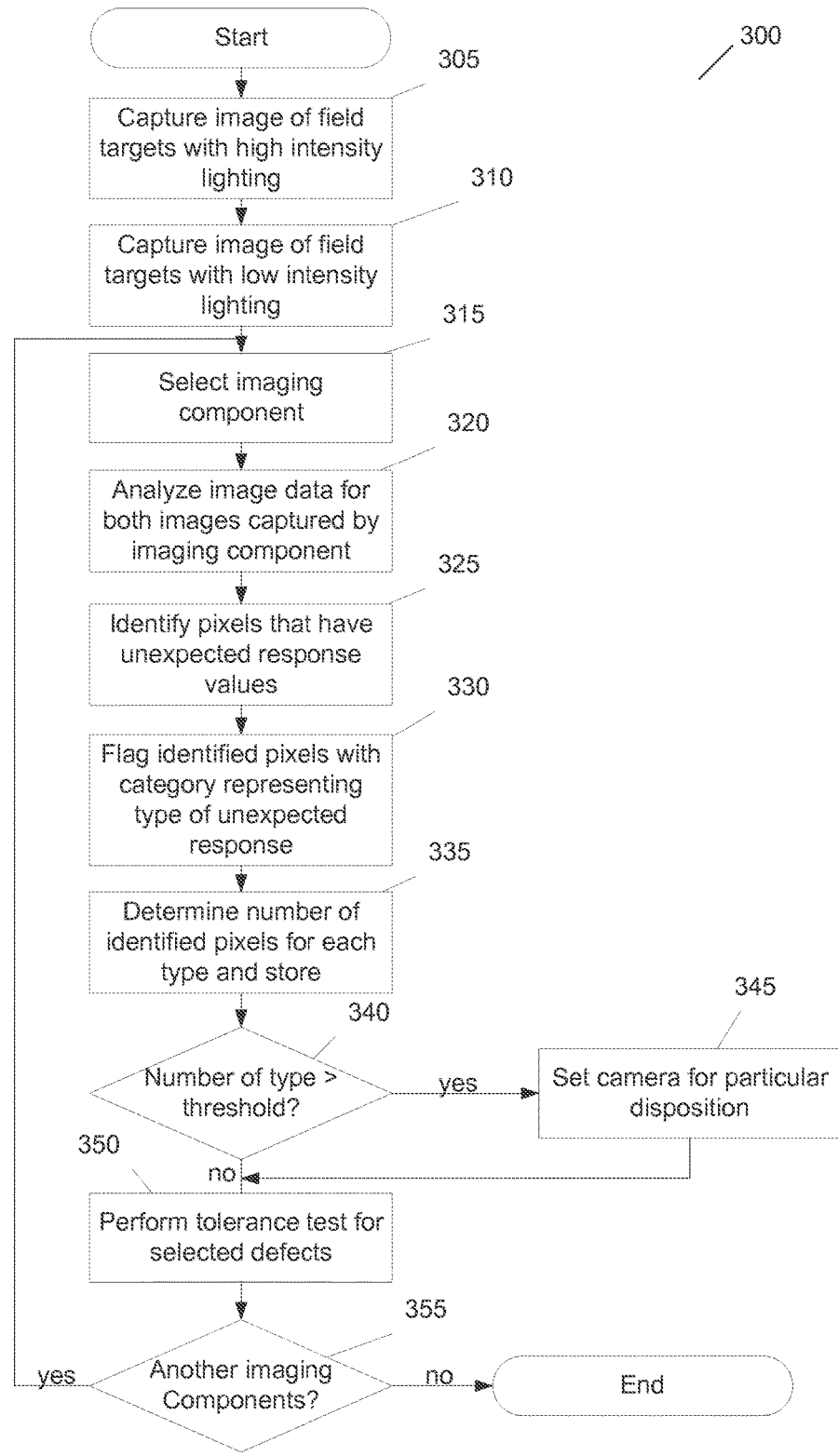
FIG. 3 illustrates a flow diagram of a defect detection process performed during a calibration process of an array camera in accordance with embodiments of this invention.
Figure 4:
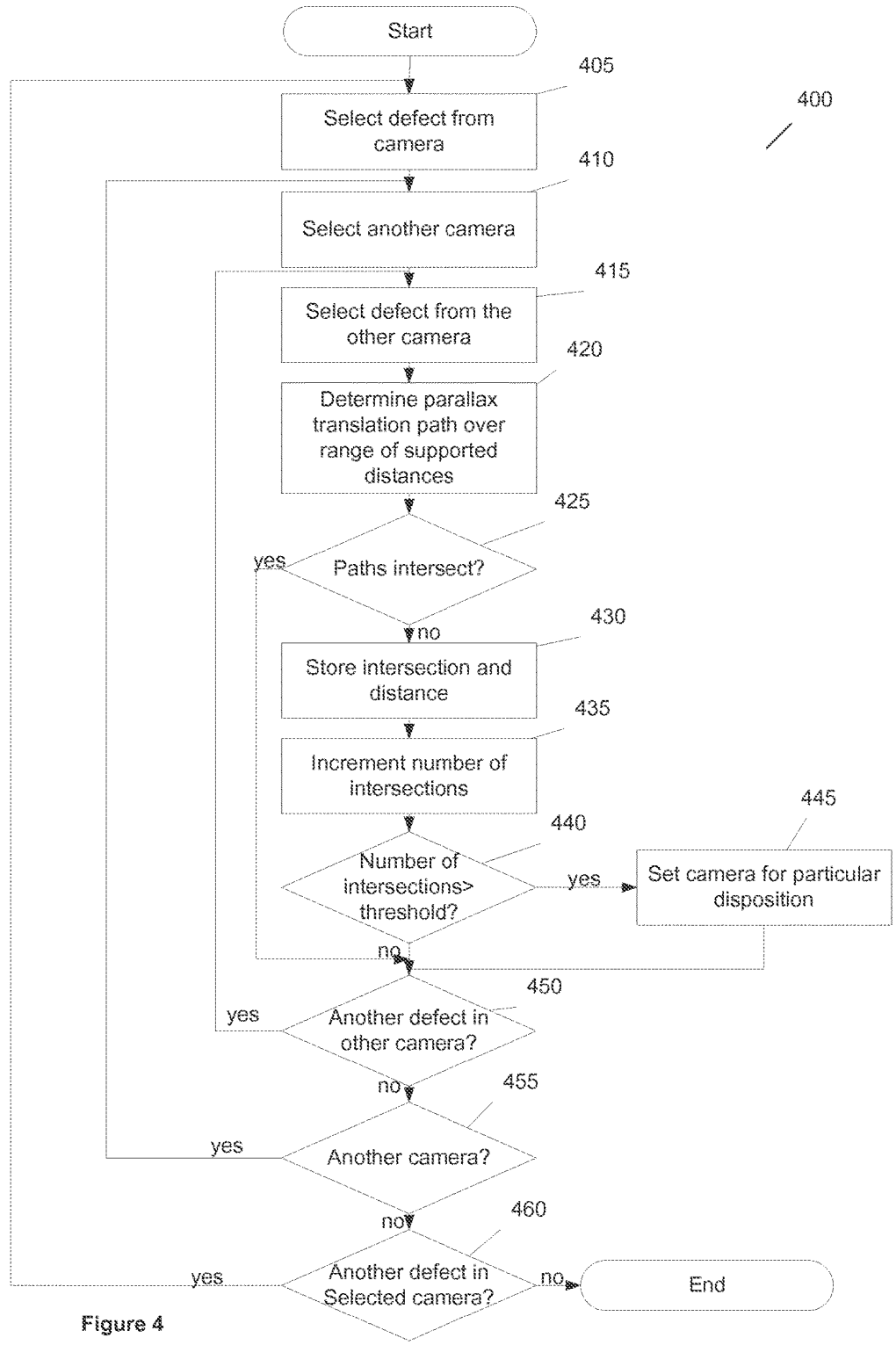
FIG. 4 illustrates a flow diagram of a defect tolerance determination process performed during a calibration of an array camera to determine whether certain defects in imaging components of the array camera may be handled during image processing in accordance with embodiments of this invention.

A defect detection process is a process that detects defects in individual pixel sensors of the imaging components in the array camera and then determines how data from the identified defective pixel sensors is to be handled. Like conventional digital imagers, the imaging components in an array camera often have typical pixel sensor defects including, but not limited to, cold pixels, cool pixels, warm pixels, hot pixels, column failures, row failures, non-uniformities, and random telegraph pixel failures. However, conventional digital cameras typically have set limits as to the number of defects in each class that can be tolerated in an imager. These limits are often zero or near zero when the failures are in a critical area of the pixel array (i.e. in the center of the pixel array). An array camera, on the other hand, may have a higher tolerance to these defects in individual imaging components because an image from an array camera is synthesized from image data received from one or more imaging components. Thus, image processing algorithms may be able to use image data from another imaging component to provide data about the image in the area covered by the image data from the defective pixel sensor in one of the imaging components. Because of this, a calibration process for an array camera should identify the defective pixels in each of the imaging components and determine if the identified defects can be tolerated during image processing. A process for identifying pixel defects in each of the imaging components of an array camera in accordance with an embodiment of the invention is illustrated in FIG. 3 and a process for determining whether certain types of defects in a particular imaging component may be tolerated during image processing in accordance with some embodiments of this invention is illustrated in FIG. 4.

To identify pixel defects, process (300) captures at least two images of a flat field target with the array camera under controlled lighting. The capturing of the image with the array camera captures image data for each of the imaging components in the array. A first one of the images is captured under high intensity lighting (305) and a second one of the images is captured under low intensity lighting (310). The detection of defective pixels may be performed in the following manner based on image data from the images captured. An imaging component is selected (315). The image data from the high intensity image (305) and low intensity image (310) captured by the selected imaging component is analyzed (320). The analyzing may include, but is not limited to, determining whether the value of a particular pixel is in agreement with the values of adjacent pixels or within an acceptable standard deviation from the values of the adjacent pixels; determining the value of the pixel is within a predetermined range or with an acceptable deviation from the range; and/or detecting patterns of values within an array of pixels that are indicative of a defect. From the analysis, pixels having an unexpected response value are identified (325). The following are examples of the categories of unexpected values that may be flagged in the identified pixels:

| TYPE OF DEFECT | DEFECT VALUE |
|---|---|
| Cold Pixel | values below a Cold Pixel Threshold, such as 10 |
| Hot Pixel | values above a Hot Pixel Threshold, such as 245 |
| Cool Pixel | values below the Cool Pixel Threshold from a nominal neighborhood value |
| Warm Pixel | values above a Warm Pixel Threshold from the nominal neighborhood value |
| Cluster Fault Threshold | values outside the Cluster Fault threshold from the nominal neighborhood value |
| A2D fault | one or value bits stuck at "0" or "1" |
| Row fault | special type of cluster fault |
| Column Fault | special type of cluster fault |

The identified pixels are stored and are flagged into categories (330) based on the type of unexpected response values received. The defective pixel location and indication of the category defect are stored for future use by the imaging processing of the array camera. The flagging and storing of the defects may be performed by generating a sorted list of identified defective pixels including a value indicating the type of defect of the pixel, such as the values shown above. The list is then searched for adjacent pixels having similar error values to identify clusters. In accordance with some embodiments, the search may be performed using two nested loops with two escape clauses. The defect values for the identified pixels in the detected cluster faults are then changed to reflect the appropriate cluster faults.

After all of the defects have been identified, the number of identified pixels having each particular type of defect is calculated and stored (335). The list of defective pixels may also be stored as defect data and any number of different data techniques may be used to reduce the size of the stored defect data. The number of each type of defect is then compared to a threshold. The threshold may be a failure limit for a particular type of error that may be determined by a manufacturer or designer. If the number of a particular type is greater than the threshold for the type (340), the camera is set for a particular disposition (345). For example, the camera may be set to "fail", "fail with too many defects", and/or "fail with logic faults". The disposition may then be used in the manufacturing process to correct the defects in the particular imaging components or determine further processing steps in the manufacturing process for the array camera.

However, as discussed above, the image processing algorithms used in an array camera may be used to compensate for some types of defects in a particular imaging component. Thus, a tolerance test is performed for the identified defects in the selected imaging component (350). A tolerance test in accordance with some embodiments of this invention is discussed below with reference to FIG. 4. Process (300) is then repeated for each of the remaining imaging components until the images for all of the imaging components have been analyzed (355).

Unlike conventional digital camera, certain pixel defects in individual imaging components including, but not limited to, cluster defects may be tolerated in an array camera because other imaging components may provide the same information as the defective pixel and or cluster of pixels. A process for determining whether particular defects in an imaging component may be tolerated during the image processing in the array camera in accordance with embodiments of this invention is illustrated in FIG. 4. An identified defect is selected (405) from the imaging component being analyzed. Typically, the defects that are selected are limited to certain types of defects. For example, the defects that may be selected may be limited to cluster defects having a size less than or greater than a predetermined threshold.

Another imaging component is also selected (410). An identified defect from the selected imaging component is then chosen (415). The process then determines whether the selected defect (415) is within a programmable distance from the selected defect (405) from the imaging component under consideration. If the defects (405) and (415) from the different imaging components are within a programmable distance, the process determines a parallax translation path over a range of supported imaging distances for each of the defects (420). The paths are compared to determine whether the paths intersect (425). If the paths intersect, the process stores the intersection and distance (430). A defect intersection counter is then incremented and stored (435).

The defect intersection counter is then compared to a threshold (440). If the defect intersection counter is greater than the threshold, the camera is set for a particular disposition (445). This is to determine whether there is image data for the area of the image covered by the image data from the defect under consideration to still generate image information for that area. Alternatively, if there is not enough image data for the area, the camera is set to a particular disposition to handle the defect through conventional means. The process continues (450) until all the defects in the selected imaging component (410) are analyzed. After all defects in the selected imaging component (410) are compared, the process repeats (455) with respect to each of the other imaging components in the array camera. After the selected defect (405) has been compared to the defects in all of the other imaging components, the process is repeated (460) from (405) for each of the other selectable defects of the imaging component under consideration. Although specific processes for performing defect detection and for assessing the significance of defects are described above, any of a variety of processes can be utilized to detect defects and to determine whether patterns of defects are likely to impact images synthesized using image data captured by an array camera in accordance with embodiments of the invention.

Photometric Calibration

Figure 5:
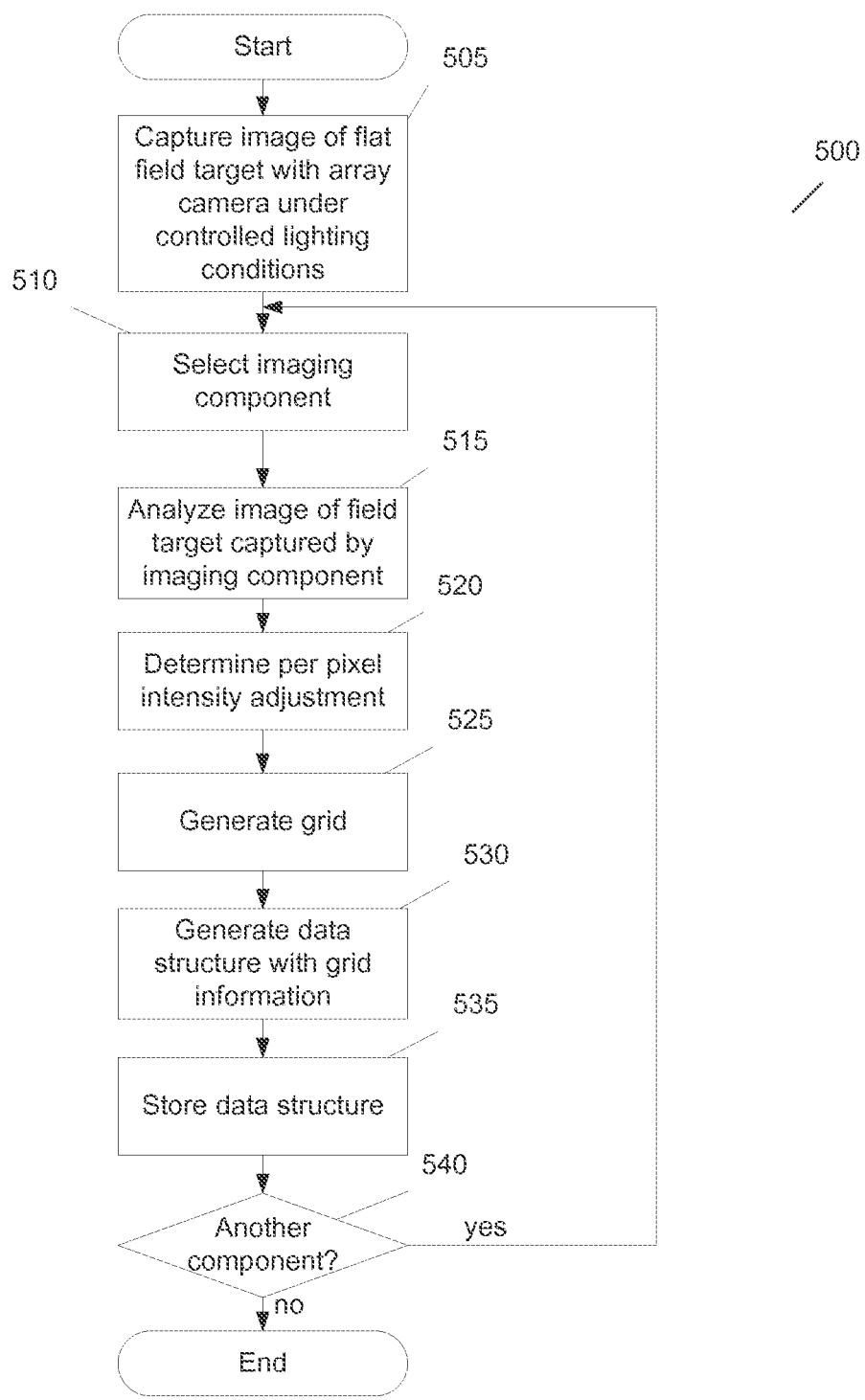
FIG. 5 illustrates a flow diagram of a photometric calibration process for imaging components performed during a calibration process for an array camera in accordance with embodiments of this invention.

In accordance with many embodiments of this invention, a photometric calibration process is performed on the array camera. The photometric calibration is performed to adjust the image data captured by the different imaging components to have a uniform intensity profile so that corresponding pixels in the different imaging components have substantially equal values modulo the spectral band being imaged when imaging the same object in physical space. A photometric calibration in accordance with an embodiment of this invention is illustrated in FIG. 5.

Photometric calibration process (500) captures an image of a flat field target with the array camera (505). The capturing of the image with the array camera generates image data of the flat field target for each of the imaging components in the array camera. The process then does a photometric calibration process for each of the imaging components.

The photometric process for imaging components begins by retrieving the image data for a selected imaging component (510). The image data for the selected imaging component is analyzed (515). The analysis is performed by viewing the image data as an intensity surface. If the image data were ideal, the image data would have a $\cos^4$ fall-off response across the Field of View. The image data is analyzed to determine the per-pixel adjustment that is needed to change the intensity of each pixel to match a profile corresponding to the $\cos^4$ fall-off that would be associated with a pixel that varies from zero (0) at the optical center to some value, typically about 15 percent less, at a predetermined Field Height (520). This may be performed by detecting a horizontal line in the image data and performing line filtering on the detected horizontal line, and fitting a cos ^4 profile to the data. This is repeated with horizontal lines throughout the image data. In other embodiments, any of a variety of line fitting techniques can be utilized as appropriate to the requirements of specific applications.

As it is common that the variation across the Field of View of any imaging device is low frequency, the process may generate a grid representing adjustments of the data from the pixels in a step-size manner (525). The grid includes the multipliers that translate the fitted curves to the desired curves from line data in a particular area of the image data. The grid data is then stored in an appropriate file or data structure for the particular imaging component (530-535). The grid data in the file or data structure is then used in the processing pipeline to adjust the intensity profiles in the image data received from the particular imaging component. The process (500) is then repeated (540) for each of the remaining imaging components in the array camera. In accordance with a number of embodiments, a photometric calibration process may include steps that balance the response between imaging components in the same spectral bands; adjust a maximum, a minimum, average, and/or other parameter of a group; and other steps that may be needed to compensate for errors that affect the photometrics of an array camera.

Although specific processes for performing photometric calibration are described above with reference to FIG. 5, any of a variety of processes can be utilized to determine photometric calibration data for use in the photometric calibration of image data captured by array cameras in accordance with embodiments of the invention. Processes for performing geometric calibration of array cameras in accordance with embodiments of the invention are discussed further below.

Geometric Calibration

Figure 6:
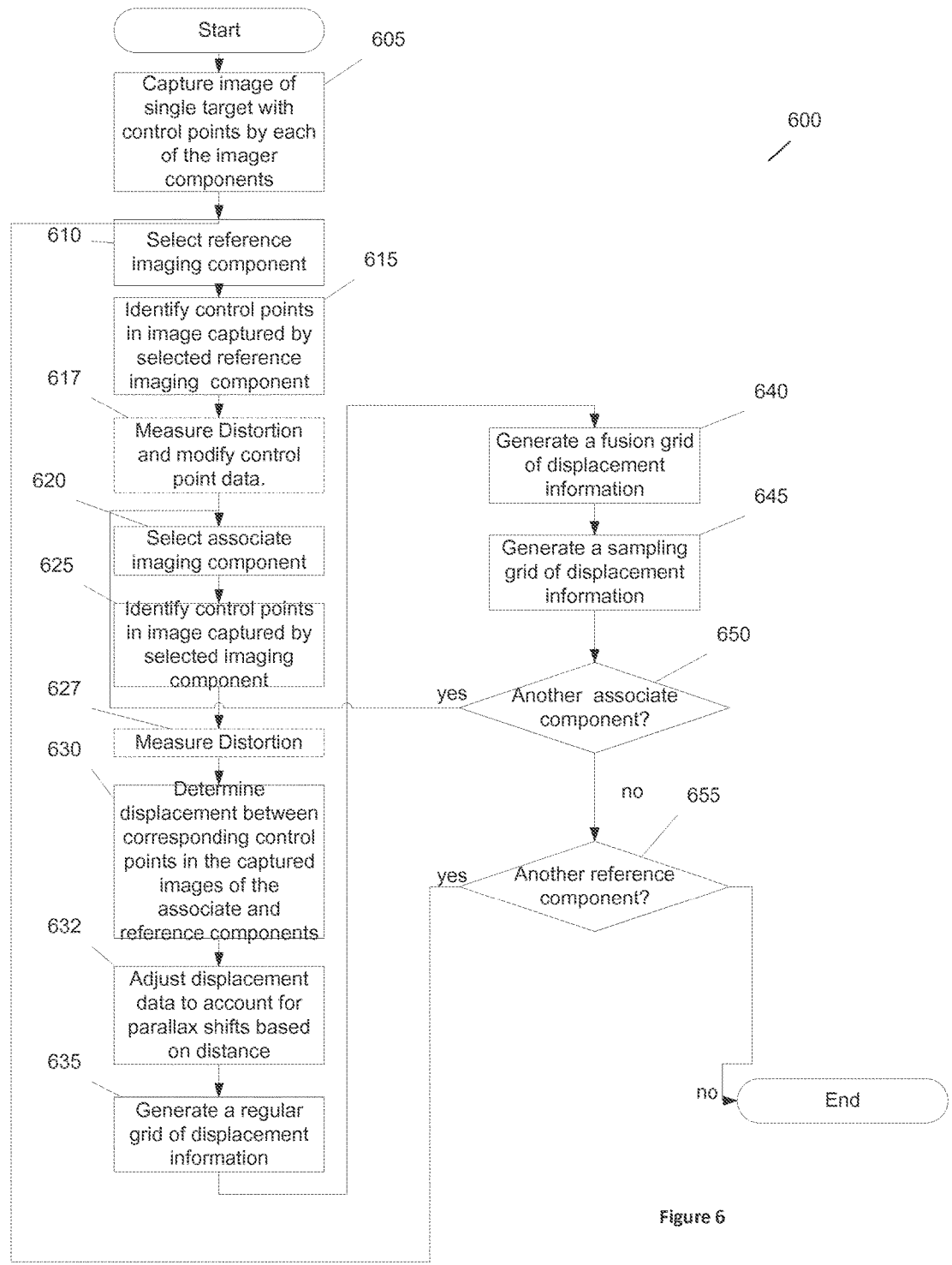
FIG. 6 illustrates a flow diagram of a geometric calibration process performed during a calibration process to gather information relating pixel information of associate and reference imaging components in the array camera in accordance with embodiments of the invention.
Figure 7:
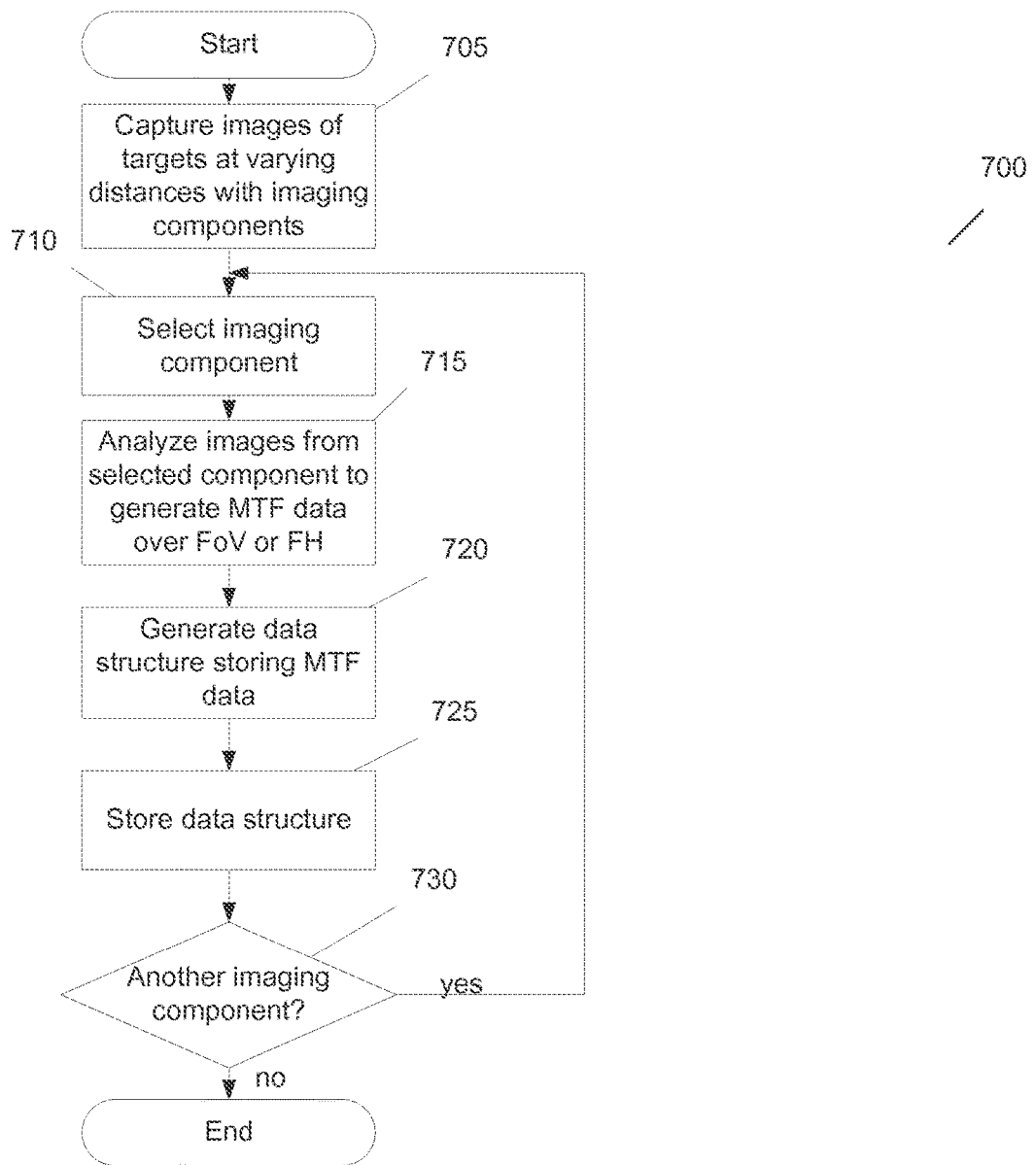
FIG. 7 illustrates a flow diagram of an MTF calibration process performed during a calibration process to obtain MTF information for each imaging component of an array camera in accordance with embodiments of this invention.

During the calibration process of an array camera, the translation information relating a position of a pixel in a reference imaging component to a position of a corresponding pixel in an associated imaging component can be determined in order to assist in fusing merge the image data captured by the various imaging components. This process is referred to as geometric calibration of the imaging components. A process for performing a geometric calibration of the reference and associate imaging components of an array camera in accordance with an embodiment of this invention is illustrated in FIG. 6.

In process (600), an image of a single target is captured with an array camera (605). The capturing of the image with the array camera involves capturing image data of the single target from each of the imaging components in the array camera. The single target image may include a set of easily identified control points. In accordance with some embodiments, the target may include a low contrast slanted edge pattern such as a checkerboard pattern. The target should change with a high enough frequency to provide a sufficient number of control points to identify an expected level of low-frequency non-uniformities in the optical systems of the imaging components.

For each reference imaging component, the following process may be used to determination the translation information that relates the associate imaging components associated with the reference imaging component. The image data from for a reference imaging component is retrieved (610). The location of the control points in the image data of the reference imaging component are identified (615). The locations of control points are identified to a reasonably fine sub-pixel level, typically to within 0.1 pixel accuracy.

In accordance with some embodiments, distortion information for the captured image optionally is measured (617). The distortion information is then used to modify control point information in the image data to compensate for the measured distortion. The modified control point information may then be used to correct geometric errors in the associate imaging components that are associated with the reference imaging component The image data for an associate imaging component is then retrieved (620) and the locations of the control points in the image data of the associate imaging component are determined (625) in a similar manner as described above with respect to the reference imaging component (615). In accordance with several embodiments, the distortion in the image data of the associate imaging component is optionally measured (627) in a manner similar to the measurement of the distortion in the image data of the reference imaging component. After the location of control points are identified in the reference image data and the associate image data, the displacements between corresponding points in the reference and associate image data are determined (630). Adjustments may optionally be made to the image data of the reference imaging component to perform certain geometric adjustments to the reference imaging component that normally would be performed during the image processing if not corrected by the translation between the reference and associate imaging components. Such adjustments may be preferable where the basic prescription for a particular imaging device exhibits geometric aberrations such as pincushion and barrel distortion exceeding certain threshold such as 10%. However, this threshold may be as low as 2-3% or even lower in accordance with some embodiments. The displacement data is also adjusted to account for the parallax shift associated with the distance from the array camera to the single target (632). Furthermore, the displacement data may optionally be adjusted to correct for geometric distortions measured in order to increase alignment accuracy between the image data of the reference and associate imaging components in accordance with a number of embodiments.

The displacement information will typically be represented by irregular grid displacement values across the image for the associate imaging component. This may then be used to generate a regular grid of displacement information (640). The grid may be adjustable in a step-size manner to account for frequency variations in the translation information across the image. The translation information in the grid may then be used to generate a fusion data structure (645). The fusion data structure includes a list of offsets along an x axis and a y axis and may be used to merge the image data from all of the image components into a single image structure. The fusion structure essentially maps each pixel of an associate imaging component into an appropriate physical relation to the corresponding pixel in the reference imaging component.

The translation information in the grid may also be used to generate a sampling data structure (650). The sampling data structure includes information that allows the image data from an associate imaging component to be sampled to obtain information that corresponds precisely to the pixel sample points in the reference camera. In other embodiments, any of a variety of data structures and/or techniques can be utilized to store the translation information as appropriate to the requirements of specific applications.

The above described process (620-650) is then repeated for each associate imaging component that is associated with a particular reference component (655). The reference imaging component process (610-655) is then repeated for each reference imaging component in the array camera to obtain the translation information for each associate imaging component associated with the reference imaging component until all the grouping of reference and associate imaging components are processed.

Since the imaging components in the array camera observe a calibration target from different points in space, there is some parallax shift in the images from each of the imaging components. This parallax shift can be calculated from measurements associated with the array camera design and physical relationship between the calibration target and the array camera. The determined parallax shift is accounted for by systematic shifts of the translation data determined as described above in accordance with many embodiments.

Certain optical characteristics of the individual imaging components, principally those items known as camera intrinsics including but not limited to focal length, radial distortions, astigmatism and other geometric distortions, may lead to increased alignment error or a distorted final image. If known, these characteristics may be used to further modify the translation data for each imaging element in such a manner that residual alignment errors are reduced and/or the geometric distortion of the image from the reference imager and, thus, the final output image of the camera are minimized. In a number of embodiments, an appropriate calibration target, for instance, a checkerboard target as described above, is used, along with precise measurement information of the calibration set-up, to provide measurements of the relevant distortion characteristics.

Although specific processes for performing geometric calibration are described above with respect to FIG. 6, any of a variety of processes can be utilized to determine scene independent geometric corrections that can be applied to image data captured by an array camera in accordance with embodiments of the invention. Processes for performing MTF calibration in accordance with embodiments of the invention are discussed further below.

MTF Calibration

The individual imaging components in an array camera often exhibit non-uniformities due to the limits of the current manufacturing technologies and associated manufacturing processes; and variation in the manufacturing materials. Some of these non-uniformities exhibit themselves as variations in the resolving power of the optics over the Field of View (FoV). The generation of high resolution images from a set of low resolution imaging devices in an array camera can rely upon an accurate understanding of, adaptation to, and/or correction of these variations. As such, a MTF calibration process may be performed to characterize the "sharpness" of the optics over the FoV of each of the imaging components in the array camera. The "sharpness" information may then be used to adjust the image data received from each imaging component to provide data from the various imaging components that essentially has a uniform MTF. A process for performing MTF calibration in accordance with embodiments of this invention is show in FIG. 7.

Process 700 includes capturing images of a target at one or more distances with the array camera (705). The capturing of the images generates image data of the target from each of the imaging components for each of the images captured. The target should include one or more slanted edge structures. For purposes of this discussion, a slanted edge structure is a structure with a relatively light area and a relatively dark area with a boundary that is a straight line that may be approximately 6 degrees from vertical. Typically, the distances used to capture the images will range from approximately Hyperfocal (HF)/2 to HF*2. For example, in an array camera having an HF of 40 cm, 10 or more images may be captured between the distances of 10 cm to 2 m. In other embodiments, any of a variety of distances to targets can be utilized as appropriate to the requirements of a specific application.

After the image data is captured, the following is performed for each imaging component (730). The image data of the captured images from a selected imaging component is retrieved (710). The image data for each particular image of the selected imaging component is analyzed to generate MTF data over FoV or Field Height (FH) (715). The analysis may be completed by measuring the MTF at various FoV positions in the image data. The MTF is then plotted as a function of distance for each of the FoV positions. The position that yields a peak value for each FoV position estimates the best focus distance for the selected imaging component and can be included in the MTF information for the imaging component.

A data structure that stores the MTF information for the selected imaging component gathered from the analysis is then generated (720) and stored (725) for use in the image processing pipeline. In other embodiments, any of a variety of data structures and/or techniques can be utilized to store MTF information obtained during calibration as appropriate to the requirements of specific applications.

While the above description contains many specific embodiments of the invention, these should not be construed as limitations on the scope of the invention, but rather as an example of embodiments thereof. Accordingly, the scope of the invention should be determined not by the embodiments illustrated, but by the appended claims and their equivalents.

What is claimed:

1. A method for calibrating an array camera using a processing system wherein the array camera includes a plurality of imaging components where the plurality of imaging components includes a reference imaging component and a plurality of associate imaging components associated with the reference imaging component, the method comprising:

performing a defect detection process that includes:
identifying pixel defects in each of the plurality imaging components, and
determining whether pixel defects in a particular imaging component may be corrected in image processing using image data from at least one other one of the plurality of imaging components by:
selecting a defect in a first one of the plurality of imaging components in the array camera and determining a parallax translation path of the defect over a range of supported distances,
determining a parallax translation path over the range of supported distances from defects in other ones of the plurality of imaging components of the array camera,
determining whether a predetermined number of parallax translation paths of defects in other ones of the plurality of imaging components intersect the parallax translation path of the selected defect, and generating a disposition output for the first one of the imaging components having the selected defect if a predetermined number of parallax translation paths for defects from other images components intersect the parallax translation path of the selected defect; and performing a geometric calibration process that includes determining translation information that relates image data from particular pixels in a reference imaging component to image data from corresponding pixels in each associate imaging component associated with the reference imaging component.

2. The method of claim 1 further comprising performing a Modulation Transfer Function (MTF) calibration process on each of the plurality of imaging components in the array camera that includes determining MTF data over the Field of View (FoV) or the Field Height (FH) for each of the imaging components.

3. The method of claim 2 wherein the MTF calibration process further comprises:
capturing image data of a target with each of the plurality imaging components;
analyzing the image data captured by the plurality of imaging components to determine MTF data over one of a FoV and FH for each of the imaging components wherein the MTF data for each of the imaging components is generated from the MTF detected in the image data; and
storing the MTF data for each of the imaging components.

4. The method of claim 1 further comprising performing a photometric calibration process of each of the plurality of imaging components in the array camera that includes determining image data adjustments for each of the imaging components that provide image data from each of the imaging components with a uniform intensity profile.

5. The method of claim 4 wherein the performing the photometric calibration comprises:
capturing image data of a flat field target under controlled lighting conditions with each of the plurality of imaging components in the array camera;
analyzing the image data of each of the imaging components to determine a per pixel adjustment needed to match cos ^4 fall-off response for an image; and
generating a grid of adjustments for each of the plurality of imaging components wherein each adjustment in the grid indicates the adjustment information for data from a set of pixels in the particular imaging component needed to match the cos ^4 fall-off response for an image.

6. The method of claim 1 wherein the identifying of defects in each of the imaging components comprises:
capturing a first set of image data of a field target under high intensity lighting with each of the plurality of imaging components;
capturing a second set of image data of a field target under low intensity lighting;
analyzing the first and second sets of image data to identify each pixel having an unexpected response value in each imaging component;
flagging the identified pixels with a category indicating the category unexpected response received for each imaging component; and
storing the identified pixels with the flagged categories.

7. The method of claim 6 wherein the detecting of defects in each imaging component further comprises:
determining the number of each category of defects identified in each imaging component;
comparing the number of each category of defects to a threshold; and
generating a disposition output for a particular imaging component in response to the number of defects in a category for the particular imaging component being greater than the threshold.

8. A device for calibrating an array camera including a plurality of imaging components where the plurality of imaging components include a reference imaging component and a plurality of associate imaging components associated with the reference imaging component comprising:
a memory; and
a processor configured via one or more applications stored in the memory to:
perform a defect detection process that includes:
identify pixel defects in each of the plurality imaging components, and
determine whether pixel defects in a particular imaging component may be corrected in image processing by:
selecting a defect in a first one of the plurality of imaging components in the array camera and determining a parallax translation path of the defect over a range of supported distances,
determining a parallax translation path over the range of supported distances from defects in other ones of the plurality of imaging components of the array camera,
determining whether a predetermined number of parallax translation paths of defects in other ones of the plurality of imaging components intersect the parallax translation path of the selected defect, and
generating a disposition output for the first one of the imaging components having the selected defect if a predetermined number of parallax translation paths for defects from other images components intersect the parallax translation path of the selected defect; and
perform a geometric calibration process that includes determining translation information that relates image data from particular pixels in a reference imaging component to image data from corresponding pixels in each associate imaging component associated with the reference imaging component.

9. A non-transitory machine readable medium containing processor instructions, where execution of the instructions by a processor causes the processor to perform a process for calibrating an array camera including a plurality of imaging components where the plurality of imaging components include a reference imaging component and a plurality of associate imaging components associated with the reference imaging component, the process comprising:
performing a defect detection process that includes:
identifying pixel defects in each of the plurality imaging components, and
determining whether pixel defects in a particular imaging component may be corrected in image processing by:
selecting a defect in a first one of the plurality of imaging components in the array camera and determining a parallax translation path of the defect over a range of supported distances,
determining a parallax translation path over the range of supported distances from defects in other ones of the plurality of imaging components of the array camera, determining whether a predetermined number of parallax translation paths of defects in other ones of the plurality of imaging components intersect the parallax translation path of the selected defect, and generating a disposition output for the first one of the imaging components having the selected defect if a predetermined number of parallax translation paths for defects from other images components intersect the parallax translation path of the selected defect; and performing a geometric calibration process that includes determining translation information that relates image data from particular pixels in a reference imaging component to image data from corresponding pixels in each associate imaging component associated with the reference imaging component.

\* \* \* \* \*